US012621251B2

(12) United States Patent
Yokoi et al.

(10) Patent No.: US 12,621,251 B2
(45) Date of Patent: May 5, 2026

(54) STORAGE SYSTEM AND CORE ALLOCATION CONTROL METHOD OF NETWORK INTERFACE

(71) Applicant: Hitachi Vantara, Ltd., Yokohama (JP)

(72) Inventors: Nobuhiro Yokoi, Tokyo (JP); Takayuki Fukatani, Tokyo (JP); Tomohiro Yoshihara, Tokyo (JP)

(73) Assignee: HITACHI VANTARA, LTD., Yokohama (JP)

( * ) Notice: Subject to any disclaimer, the term of this patent is extended or adjusted under 35 U.S.C. 154(b) by 64 days.

(21) Appl. No.: 18/830,780

(22) Filed: Sep. 11, 2024

(65) Prior Publication Data

US 2025/0202835 A1 Jun. 19, 2025

(30) Foreign Application Priority Data

Dec. 15, 2023 (JP) ................................. 2023- 212225

(51) Int. Cl.
H04L 47/78 (2022.01)
H04L 47/762 (2022.01)

(52) U.S. Cl.
CPC .......... H04L 47/781 (2013.01); H04L 47/762 (2013.01)

(58) Field of Classification Search
CPC ...... G06F 9/5027; G06F 3/0631; G06F 3/067; G06F 3/0658
See application file for complete search history.

(56) References Cited

U.S. PATENT DOCUMENTS

| | | | |
|---|---|---|---|
| 9,100,349 B2* | 8/2015 | Balakavi ................. | H04L 12/66 |
| 10,956,346 B1* | 3/2021 | Ben-Yehuda ....... | G06F 13/4027 |
| 11,700,214 B1* | 7/2023 | Yokoi ................. | H04L 49/9052 |
| | | | 370/412 |
| 2023/0004303 A1* | 1/2023 | Yang ................... | G06F 12/0246 |
| 2023/0251971 A1* | 8/2023 | Sharma ................ | G06F 12/109 |
| | | | 711/203 |
| 2025/0202832 A1* | 6/2025 | Chapman ................ | H04L 47/39 |

* cited by examiner

*Primary Examiner* — Kostas J Katsikis
(74) *Attorney, Agent, or Firm* — MATTINGLY & MALUR, PC

(57) ABSTRACT

A storage system includes a storage controller on which a network interface including a processor including a plurality of cores, a memory, and a plurality of ports is mounted. The processor allocates at least one occupied core to each of the plurality of ports, controls the occupied core to execute a management process of the port to which the occupied core is allocated and a network protocol process of communication performed via the port to which the occupied core is allocated, and controls the cores other than the occupied core to execute the network protocol process of the communication performed via the port.

10 Claims, 19 Drawing Sheets

FIG. 8

| CURRENT ALLOCATION MODE | CURRENT ALLOCATION MODE |
|---|---|
| MODE 1 | MODE 2 |

801     802     800

STORAGE SYSTEM AND CORE ALLOCATION CONTROL METHOD OF NETWORK INTERFACE

CLAIM OF PRIORITY

The present application claims priority from Japanese patent application JP 2023-212225 filed on Dec. 15, 2023, the content of which is hereby incorporated by reference into this application.

BACKGROUND OF THE INVENTION

1. Field of the Invention

The present invention relates to a network interface mounted on a storage system.

2. Description of the Related Art

With the increase in network speed and the emergence of new protocols, an increase in network interface speed and multi-protocol support are also required in an enterprise storage system. Conventionally, a CPU on a storage controller supports a plurality of protocols, or a plurality of protocols are supported by offloading to protocol-dedicated hardware. For example, U.S. Pat. No. 9,100,349 discloses a technique for supporting a plurality of protocols by using a network interface card (NIC) on which protocol chips of Ethernet and FC are mounted.

However, in a case where the CPU of the storage controller is used for a protocol process in communication, there is a problem that the CPU resources are consumed in the protocol process. In a case where a channel board (CHB) on which an ASIC dedicated for protocol process is mounted is used, it is necessary to develop a dedicated ASIC for each protocol, and it is difficult to support a protocol quickly.

Regarding this, a SmartNIC that includes a general-purpose processor and a memory and executes a process for a network protocol has appeared. In the SmartNIC, for example, the same operating system as that running on a server system can be operated, and a software protocol stack, an application, and the like used therein can be operated. Since the network protocol process can be implemented in software, it is possible to quickly support a plurality of protocols and new protocols, and to flexibly support the update of the network protocol process.

SUMMARY OF THE INVENTION

The SmartNIC is equipped with a general-purpose processor including a plurality of cores, a memory, and a port. A core allocation control method in the related art includes a method of allocating a core to each of ports at a predetermined ratio and a method of allocating a core to each port in a time division manner.

In the case of the former allocation method, since the processing performance of one port depends on the number of allocated cores, there is a problem that it is not possible to exhibit the maximum performance of the SmartNIC. On the other hand, in a case where all cores are allocated to one port in order to exhibit the maximum performance, it is not possible to execute the network protocol process of the other ports.

In the case of the latter allocation method, in a case where a management process such as resetting of another port has occurred during execution of a network protocol process of a certain port, a core allocated to the certain port is allocated to another port, which may affect the network protocol process of the certain port.

An object of the present invention is to realize core allocation control capable of suppressing an influence of a process between ports and sufficiently exhibiting performance of a network protocol process of a port in a network interface mounted in a storage system.

A representative example of the invention disclosed in the present application is as follows. That is, a storage system includes at least one storage controller on which a network interface including a processor including a plurality of cores, a memory connected to the processor, and a plurality of ports connected to the processor is mounted. The processor allocates at least one occupied core to each of the plurality of ports, controls the occupied core to execute a management process of the port to which the occupied core is allocated and a network protocol process of communication performed via the port to which the occupied core is allocated, and controls the cores other than the occupied core to execute the network protocol process of the communication performed via the port.

According to the present invention, it is possible to realize core allocation control capable of suppressing an influence of a process between ports and sufficiently exhibiting performance of a network protocol process of a port in a network interface mounted in a storage system. Objects, configurations, and effects other than those described above will be clarified in the following description of embodiments.

BRIEF DESCRIPTION OF THE DRAWINGS

FIG. 8 is a diagram illustrating an example of allocation mode management information retained by the network interface in the first embodiment;

DESCRIPTION OF THE PREFERRED EMBODIMENTS

Figure 1:
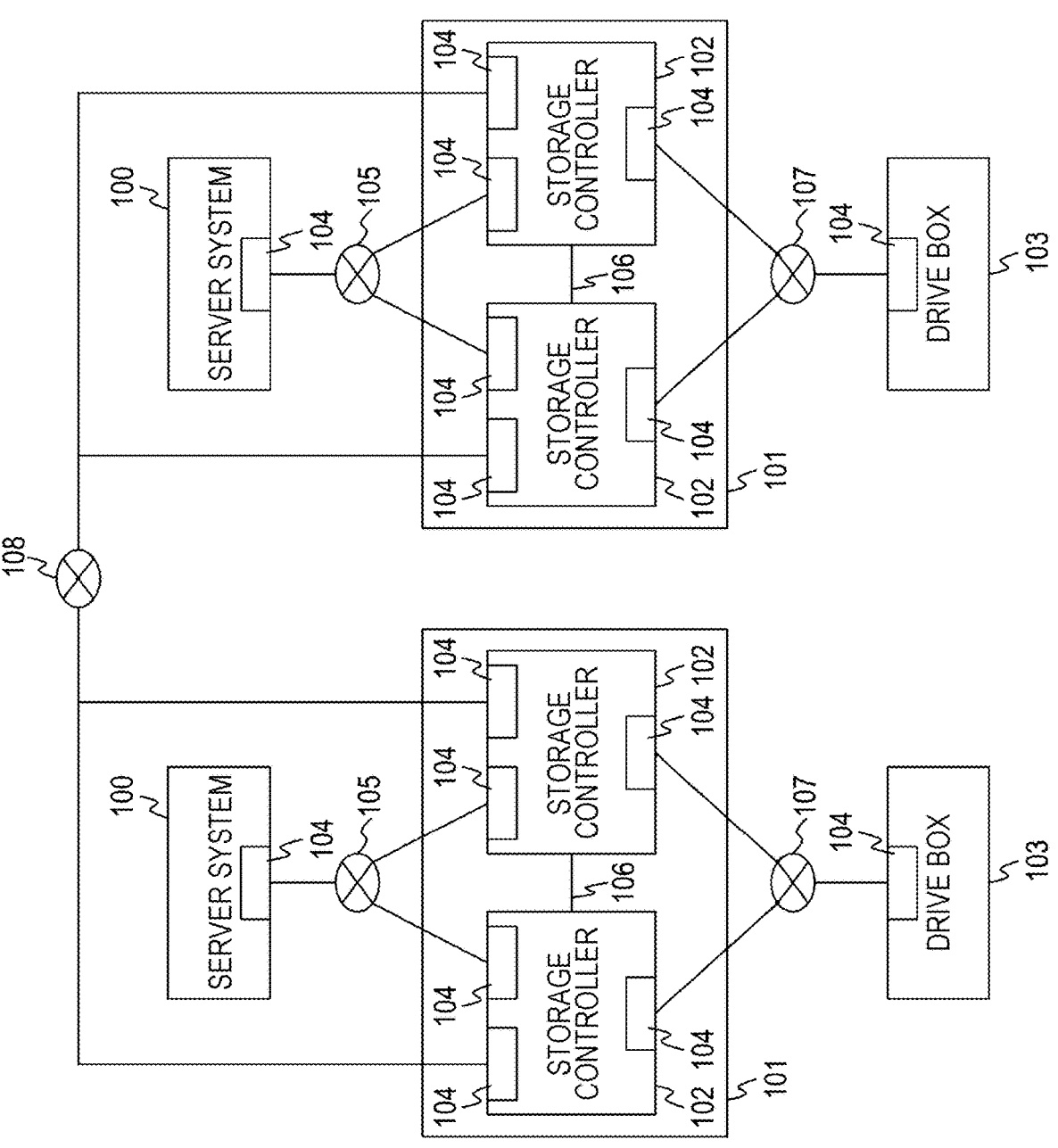
FIG. 1 is a diagram illustrating a configuration example of an information processing system according to a first embodiment.

Hereinafter, an embodiment will be described with reference to the drawings. The following description and drawings are examples for describing the present invention, and are omitted and simplified as appropriate for clarity of description. The present invention can be implemented in other various forms, and each component may be singular or plural unless otherwise limited.

Embodiments described below do not limit the inventions according to the claims, and all combinations of elements described in the embodiments are not necessarily essential to the solution of the inventions.

In the following description, various types of information may be described by expressions such as "table", "list", and "queue", but the various types of information may be expressed by data structures other than these expressions. In order to show that the various types of information do not depend on the data structure, "table of xxx", "list of xxx", "queue of xxx", and the like may be referred to as "xxx information" or the like. In the following description, expressions such as "identification information", "identifier", "name", "ID", and "number" are used when describing the identification information, but these expressions can be replaced with each other.

In the following description, in a case where there are a plurality of components having the same or similar functions, the same reference numerals are basically given to denote the components, but means for realizing the functions may be different even though the functions are the same. Furthermore, the embodiments described later may be implemented by software running on a general-purpose computer, or may be implemented by dedicated hardware or a combination of software and hardware.

In addition, in the following description, processes may be described with a "program" as a subject. The program is executed by a processor (for example, CPU: Central Processing Unit), and thus, a predetermined process is executed by appropriately using a storage resource (for example, memory), and/or an interface device (communication port), or the like. Therefore, the description may be made assuming that the subject of the process is the processor.

The process described with the program as the subject may be a process executed by a computing device (for example, a computing host and a storage device) including a processor. In the following description, the expression "controller" may refer to a processor or a hardware circuit that performs a part or the entirety of the process executed by the processor.

The program may be installed in each computing device from program sources (for example, a storage medium readable by a program distribution server or a computing device). In this case, the program distribution server includes a CPU and a storage resource. The storage resource further stores a distribution program and a program to be distributed. When the CPU executes the distribution program, the CPU of the program distribution server may distribute the program to be distributed to another computing device.

In addition, in the following description, two or more programs may be implemented as one program, or one program may be implemented as two or more programs.

In the following description, a storage drive or simply a drive means a physical storage device, and may typically be a non-volatile storage device (for example, an auxiliary storage device). The drive may be, for example, a hard disk drive (HDD) or a solid state drive (SSD). Different types of drives may be mixed in the storage system.

In the following description, a drive has a VOL. "VOL" is an abbreviation for volume, and may be a physical storage device or a logical storage device. A VOL may be a substantial VOL (RVOL) or a virtual VOL (VVOL). "RVOL" may be a VOL based on a physical storage resource (for example, one or more RAID groups) of the storage system having an RVOL.

"VVOL" may be any of an externally connected VOL (EVOL), a capacity expansion VOL (TPVOL), and a snapshot VOL. The EVOL is based on a storage space (for example, VOL) of an external storage system, and may be a VOL according to a storage virtualization technique. The TPVOL may be VOL including a plurality of virtual areas (virtual storage areas) and according to a capacity virtualization technique (typically, Thin Provisioning).

In addition, in the following description, the VOL recognized by a host (VOL provided to the host) is referred to as "LDEV". In the following description, the LDEV is a TPVOL (or RVOL), and a pool is a TP pool. However, the features of the present disclosure can also be applied to a storage device that does not employ a capacity expansion technique (Thin Provisioning).

"Pool (POOL)" is a logical storage area (for example, a set of a plurality of pool VOLs) and may be prepared for each application. For example, the pool may be a TP pool. The TP pool may be a storage area including a plurality of pages (substantial storage area). In a case where no page is allocated to the virtual area (virtual area of the TPVOL) to which an address designated by a write request received from a host computer (the host below) belongs, the storage controller allocates a page from the TP pool to this virtual area (write destination virtual area) (even though a page is already allocated to the write destination virtual area, a new page may be allocated to the write destination virtual area). The "pool VOL" may be a VOL as a component of the pool. The pool VOL may be an RVOL or an EVOL.

In the following description, the VOL may be "Logical Unit (LU below)" in SCSI or "Name Space (NS below)" in NVMe.

In the following description, "RAID" is an abbreviation of Redundant Array of Inexpensive Disks. The RAID group includes a plurality of drives (typically the same type of drives), and stores data according to a RAID level associated with the RAID group. The RAID group may be referred to as a parity group. The parity group may be, for example, a RAID group that stores parity.

A network interface device (also simply referred to as a network interface below) according to an embodiment of the present specification can be implemented in an information processing system including a server system and a storage system. The storage system may include a storage controller and a drive box. The network interface may include, for example, a general-purpose processor, a memory, a network controller, and an interface with a host system.

The configuration using a general-purpose processor and a memory, which is capable of realizing a software-based protocol process solves a point that hardware needs to be updated each time support for a new protocol such as NVMe/TCP in addition to iSCSI is increased. For example, the replacement of software of the network interface is supported by using a general-purpose processor, a memory, or the like to follow a change so that a change due to switching from iSCSI to NVMe/TCP, a change due to specification update of NVMe/TCP, or even a change to a new protocol can be quickly handled. The network interface in the embodiment of this specification supports a plurality of network protocol processes at the same time.

First Embodiment

FIG. 1 is a diagram illustrating a configuration example of an information processing system according to a first embodiment.

The information processing system includes one or a plurality of server systems 100 and a storage system. The storage system includes one or a plurality of storage devices 101 and one or a plurality of drive boxes 103.

The storage device 101 includes one or a plurality of storage controllers 102. In FIG. 1, each storage device 101 includes two storage controllers 102. The storage controller 102 is connected to one or a plurality of server systems 100 via a front-end network 105.

The drive box 103 is connected to one or a plurality of storage controllers 102 via a back-end network 107. In addition, the storage controller 102 is connected to another storage controller 102 at a short distance via an inter-storage controller network 106, and is connected to another storage controller 102 at a middle distance or a long distance via an external network 108.

The front-end network 105 is a storage area network that connects the storage controller 102 and the server system 100, and for example, an IP network such as iSCSI or NVMe/TCP (NVMe over TCP) is used.

The back-end network 107 is a network that connects the storage controller 102 and the drive box 103, and for example, an IP network such as iSCSI or NVMe/TCP is used.

The inter-storage controller network 106 is a network used for redundancy of the storage controller 102, and is configured by a broadband interconnect. Duplication of write data, sharing of metadata, or the like is performed by using this network. Thus, even if one storage controller 102 is blocked due to maintenance, failure, or the like, a storage process can be continued by the other storage controller 102.

The external network 108 is a wide area network (WAN) or a local area network (LAN). Communication is performed by using a protocol data unit (PDU) of iSCSI or NVMe/TCP, for example, in a network in which a data link layer is Ethernet (registered trademark), an Internet layer is an Internet protocol, and a transport layer is a TCP, an UDP, or the like. The network can take the form of an Internet line or a dedicated line. In a case where the communication delay increases depending on the distance, and the network device is not configured only by a lossless device, an occurrence rate varies depending on the line type, but an occurrence of a packet loss is assumed.

The server system 100 is a host machine on which a user application or the like operates, includes one or a plurality of processors, and is configured to include one or a plurality of storage devices such as a memory and an auxiliary storage device. For example, a database or a Web service operates, and the server system 100 writes and reads data created by the database or the Web service to and from the storage controller 102 via a network interface 104. The server system 100 further includes the network interface 104 as an interface device for a connection to the storage controller 102. The server system 100 may include a plurality of server groups, and each server group may include the network interface 104 and may connect the storage controller 102 and another server system 100.

The storage controller 102 includes one or a plurality of processors and memories. It is assumed that the storage controllers 102 in the storage device 101 have the same configuration.

The processor includes a plurality of cores, and the cores instruct transfer of data stored in the corresponding drive box 103 in response to a read command and a write command from the server system 100.

The memory includes, for example, a semiconductor memory such as a synchronous dynamic random access memory (SDRAM). The memory may be configured by combining a volatile memory and a non-volatile memory such as a storage class memory (SCM). The memory stores, as main storage of the processor, an execution program (such as a storage control program), a management table referred to by the processor, and the like. The memory is also used as a disk cache (cache memory) of the storage controller 102.

The storage controller 102 includes a network interface 104 as an interface device for a connection to the drive box 103. The network interface 104 performs communication of information related to a storage process such as data transfer and data copy instructed from the server system 100 with the drive box 103.

The drive box 103 includes a plurality of drives such as solid state drives (SSDs) and hard disk drives (HDDs). In addition, the drive box 103 includes an internal switch, and a processor and a memory used for a transfer process in order to connect a plurality of drives and the storage controller 102. The drive box 103 receives, stores, and retains data generated by the server system 100 via the storage controller 102.

In the drive box 103, in order to secure the availability of the retained data, RAID may be set between the built-in drives, or RAID may be set between a plurality of drive boxes 103. In addition, the drive box 103 includes a network interface 104 as an interface device for a connection to the storage controller 102.

The network interface 104 is mounted on each of the server system 100, the storage controller 102, and the drive box 103, and is a device as a connection interface between various devices and various networks.

The network interface 104 may be, for example, a SmartNIC. Various functions of the SmartNIC are implemented by using a general-purpose processor mounted on the SmartNIC and a partial hardware off-load engine. In addition, the SmartNIC may be configured by using a field programmable gate array (FPGA), and in this case, each function is realized on the FGPA. Furthermore, as another form, a configuration as dedicated interface hardware of which the entirety is implemented by hardware may be made. Details of the network interface 104 will be described later.

The information processing system and the storage system may include systems other than those described here. For example, a network device such as a switch or a router may be connected between networks, or a device for monitoring or maintenance may be connected to each network. In addition, a configuration of a connection to a storage service on a public cloud via the external network 109 may be made.

The network interface 104 of the server system 100 has initiator software in iSCSI or NVMe/TCP in order to read and write data of the drive box 103 via the storage controller 102. On the other hand, the network interface 104 of the storage controller has target software.

The network interface 104 of the storage controller 102 has initiator software in iSCSI or NVMe/TCP in order to read and write data of the drive box 103. On the other hand, the network interface 104 of the drive box 103 has target software.

Further, the network interface 104 of the storage controller 102 has initiator software in iSCSI or NVMe/TCP in order to read and write data of other storage devices 101. On the other hand, the network interface 104 of the other storage device 101 has target software.

A part of the network interface 104 may be an NIC that does not have a SmartNIC function. For example, a configuration in which the network interface 104 mounted on the server system 100 is a general NIC and operates as an initiator, and the network interface 104 mounted on the storage controller 102 is a SmartNIC and operates as a target may be made.

Figure 2:
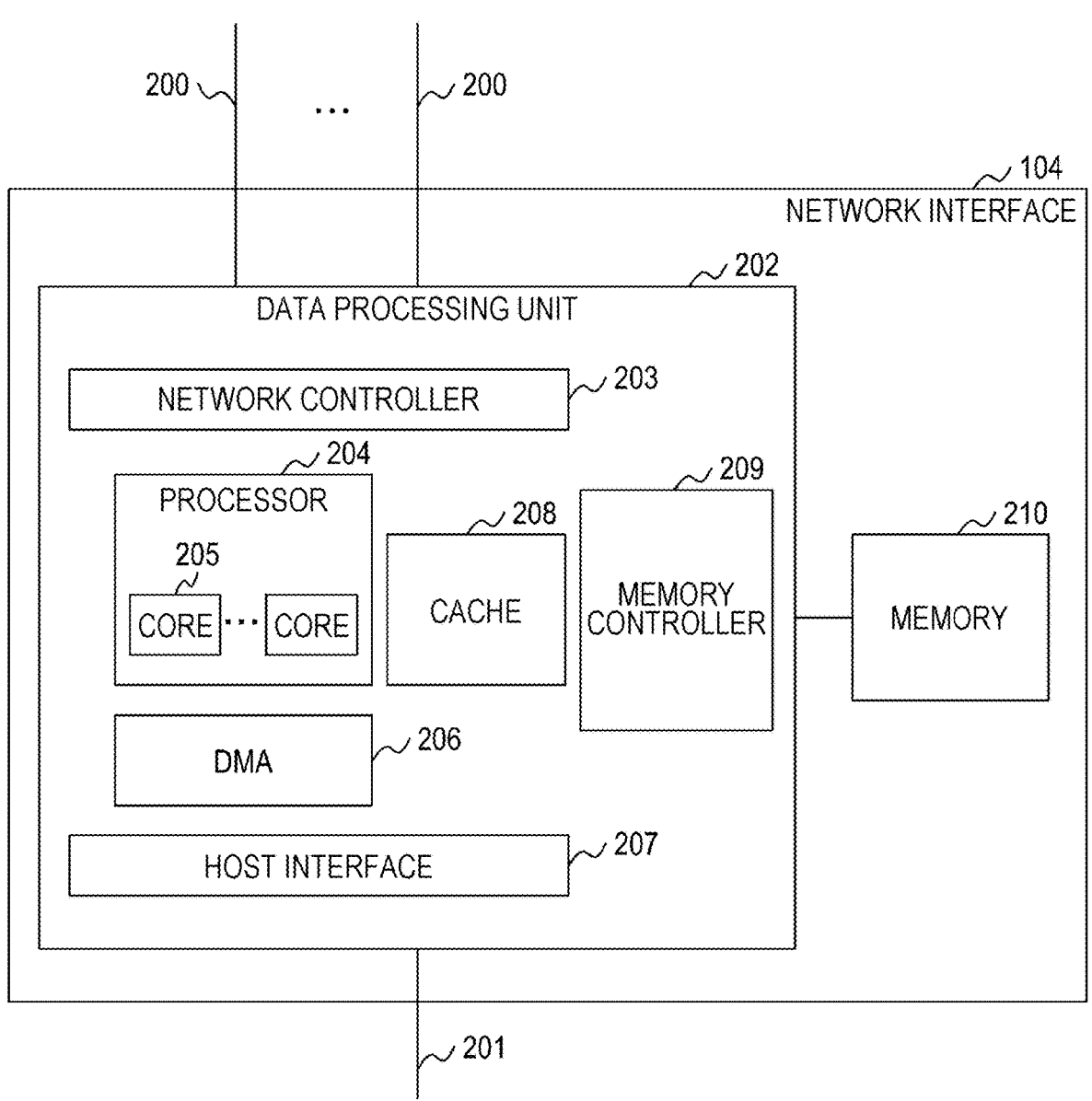
FIG. 2 is a diagram illustrating a configuration example of a network interface in the first embodiment.

FIG. 2 is a diagram illustrating a configuration example of the network interface (SmartNIC) 104 in the first embodiment.

The network interface 104 is connected to a device on which the network interface 104 is mounted, for example, an internal configuration of the storage controller 102 and the server system 100, the drive box 103, or the like via the host bus 201. The network interface 104 is connected to another device via a network path 200, for example, via an IP network.

The network interface 104 includes a data processing unit 202 and a memory 210. The data processing unit 202 includes a host interface 207 and a network controller 203. The data processing unit 202 further includes a processor 204, a memory controller 209, a direct memory access (DMA) controller 206, and a cache 208. In addition, the network interface 104 has one or more ports.

The host bus 201 is a bus that connects the network interface 104 to the storage controller 102, the server system 100, the drive box 103, and the like. The host bus 201 is a broadband and high-speed interconnect, and is configured to be connected to, for example, a processor or the like of a device on which the host bus is mounted, by PCIe.

The host interface 207 is an interface for connecting the network interface 104 and a host system (also simply referred to as a host below) via the host bus 201. For example, in a case where the host bus 201 is PCIe, for example, a PHY of PCIe can be included.

The DMA controller 206 transmits and receives data between the memory 210 of the network interface 104 and the memory of the host.

The network path 200 is, for example, an IP network path, and takes a network form of a WAN, a LAN, or a storage area network (SAN). The network interface 104 performs communication via one network path 200 or two or more network paths 200 in consideration of redundancy.

The network controller 203 is an interface for connecting the network interface 104 to the network path 200. The network controller 203 executes, for example, physical layer processing such as PHY and stateless processes of a data link layer, an Internet layer, and a transport layer. The network controller 203 executes, for example, checksum and frame processes.

The network controller 203 supports, for example, Ethernet, IP, TCP, UDP, or the like. Further, offload engines of Internet security protocol (IPsec), transport layer security (TLS), data integrity field (DIF), or the like may be included. In addition, a configuration that supports connection with an optical cable, a copper cable, or the like is adopted.

The processor 204 is, for example, a general-purpose processor, and executes, for example, an operating system. The processor 204 further executes other software to execute processes such as a protocol process, a command process, and management of the network interface 104. The processor 204 can have any configuration, and can include, for example, one or more CPUs or micro processing units (MPUs) and include a plurality of cores 205. The processor 204 is hardware physically different from the processor in the storage controller 102, and each processor executes the own process. The processor 204 executes a network protocol process in communication with the host (for example, server system 100) connected via a port. The processor included in the storage controller 102 executes storage process.

The memory 210 includes, for example, a semiconductor memory such as an SDRAM, and may be configured in combination with a non-volatile memory such as an SCM. The memory 210 stores, as main storage of the processor 204, an execution program (command codes of a protocol process or command process), a management table referred to by the processor, and the like. The memory 210 is also used as a buffer for commands and data to be transmitted and received to and from the network. Further, the memory takes a queuing interface with the network controller 203 and the host interface 207 and stores a queue descriptor, an index, and the like.

The memory controller 209 is an interface for controlling reading and writing of data from and to the memory 210. The memory controller 209 may be built in, for example, the processor 204, the data processing unit 202, or the network interface 104.

The cache 208 temporarily stores data between the memory 210 and the processor 204. The processor 204 can access the cache 208 faster than the memory 210. The data read from the memory 210 is stored in the cache 208. The processor 204 accesses the cache 208 and reads data (including a command). The cache 208 may have a hierarchical structure. Layers are referred to as an L1 cache, an L2 cache, and the like in order from a layer closer to the processor. The cache 208 may be in the processor 204. When the cache has a hierarchical structure, only some layers may be in the processor 204 and the remaining layers may be outside of the processor 204. The processor 204 and the DMA controller 206 secure coherence to the cache 208 (have consistency).

It is assumed that the information processing system and the storage system may include components other than those described herein. For example, a module or an interface for monitoring or maintenance, and a non-volatile storage device in which an operating system or a software program operating on the network interface 104 is stored may be added.

Figure 3:
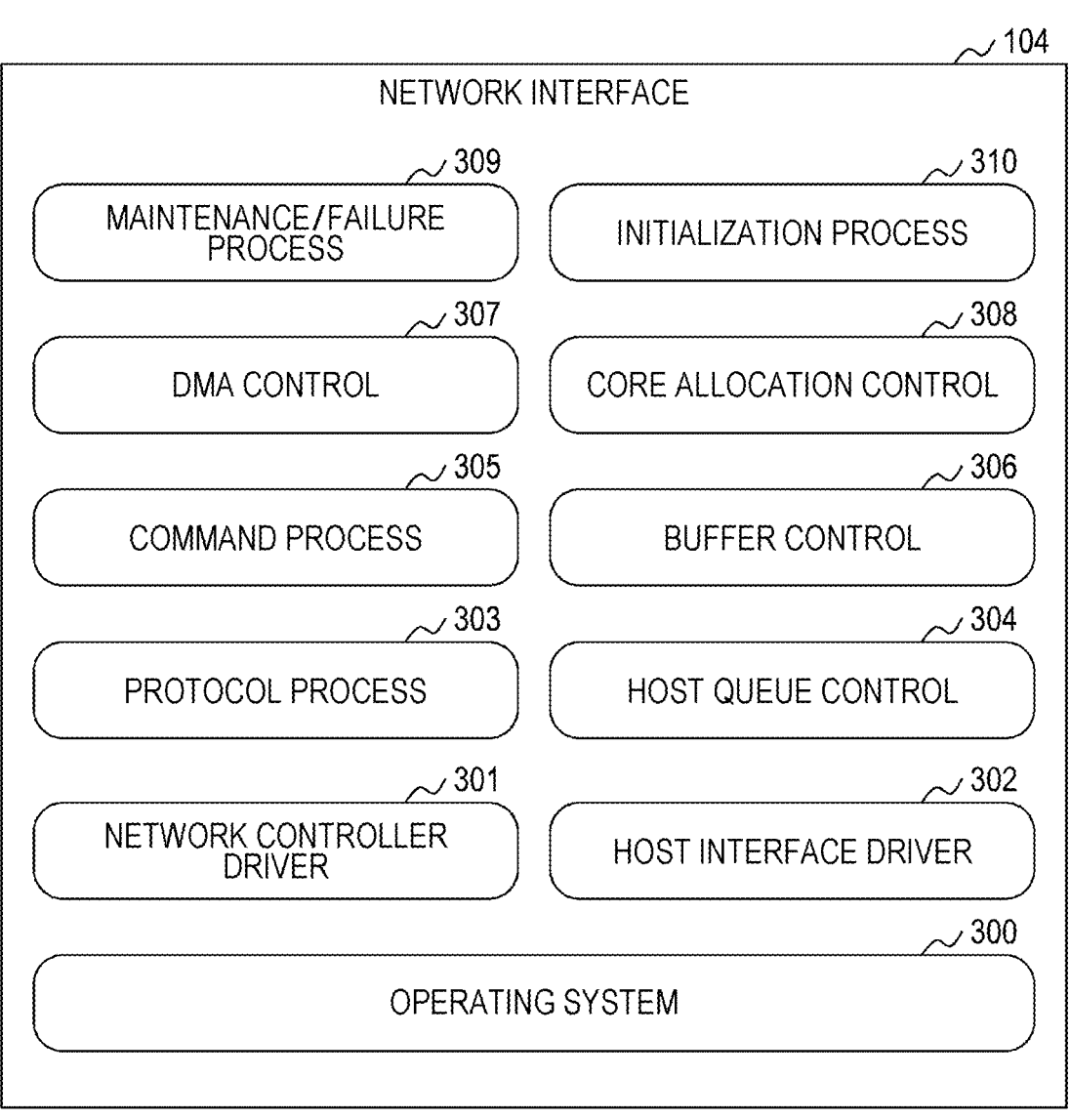
FIG. 3 is a diagram illustrating a program configuration of the network interface in the first embodiment.

FIG. 3 is a diagram illustrating a program configuration of the network interface 104 in the first embodiment.

In order to realize a software-based changeable processing function, the network interface 104 operates an operating system 300 by using the processor 204, the cache 208, and the memory 210, and operates software programs for various types of processing thereon.

Software programs 300 to 310 are loaded on the memory 210 and executed by the processor 204. Some commands are stored in the cache 208. Data integrity field (DIF), cyclic redundancy check (CRC), encryption, compression, hashing, a parity process, and the like may be implemented in dedicated hardware and controlled by software to improve efficiency.

The operating system 300 is a basic software program as a base for operating the network interface 104, and manages the entirety of the network interface 104. The operating system 300 provides a use environment that is common for each piece of software running on the processor 204 of the network interface 104. The operating system 300 may be an embedded operating system or a general-purpose operating system running on a server, for example, Linux (registered trademark) or the like.

A network controller driver 301 is driver software for controlling the network controller 203. The network controller driver 301 outputs a parameter set of a packet process to be offloaded at the time of packet generation or packet reception to the network controller 203. Further, the network controller driver 301 outputs a packet generated by a protocol process 303 to the network controller 203 for transmission. In addition, the network controller driver 301 outputs a packet received from the network controller 203 to the protocol process 303.

The host interface driver 302 is driver software for controlling the host interface 207. Communication between the network interface 104 and the host is performed via the host interface driver 302.

The protocol process 303 executes generation of a transmission packet and a transmission process thereof in cooperation with a command process 305, a DMA control 307, and the network controller driver 301. In addition, the protocol process 303 processes the received packet, extracts the control information and information and data such as an iSCSI PDU and an NVMe/TCP PDU, and outputs the extracted information to a command process 305.

The protocol process 303 executes an IP header process of the Internet protocol layer, a TCP header process and an UDP header process of the transport layer, and an iSCSI process and an NVMe/TCP process. For example, the protocol process 303 executes a socket program or a program such as an iSCSI initiator or target, and an NVMe/TCP initiator or target.

A host queue control 304 is software for controlling a queue interface for transmitting and receiving commands to and from the host. The host queue control 304 manages a queue of commands to be transmitted to the host and a queue of commands received from the host in the network interface 104. The host queue control 304 stores a command to the host or a command from the host in a queue. In addition, for example, Head and Tail when the queue has a ring structure are controlled. The host queue control 304 controls Head and Tail of the queue retained by the host.

The command process 305 receives a command for controlling the network interface 104 from the host and controls the network interface 104. The command process 305 receives a network protocol process request from the host, starts the protocol process 303, and transmits, as a response, a processing result of the protocol process 303 to the host. In addition, the command process 305 starts the DMA control 307 and executes a response process, in order to transfer data to the memory secured by the host. Furthermore, the command process 305 performs initial setting, setting change, software exchange of the network interface 104, notification to the host at the time of failure, and the like.

A buffer control 306 is software for controlling a buffer that temporarily retains data in the memory 210. The buffer stores data that is received from the network and transferred to the host or data that is received from the host and transmitted to the network. The buffer control 306 secures, uses, and manages buffer groups having a plurality of different sizes. The buffer control 306 controls the buffer to improve a cache hit rate.

For example, the DMA control 307 executes an interface process with DMA hardware in order to control data transfer between the memory secured on the host side and the memory 210 on the network interface 104.

A core allocation control 308 controls allocation of the core 205 to the port. Details of the allocation control of the core 205 will be described later.

A maintenance/failure process 309 supports update of software of the network interface 104, detection of a hardware failure, notification to the host, and the like.

An initialization process 310 initializes hardware constituting the network interface 104 and initializes various types of software.

Figure 4:
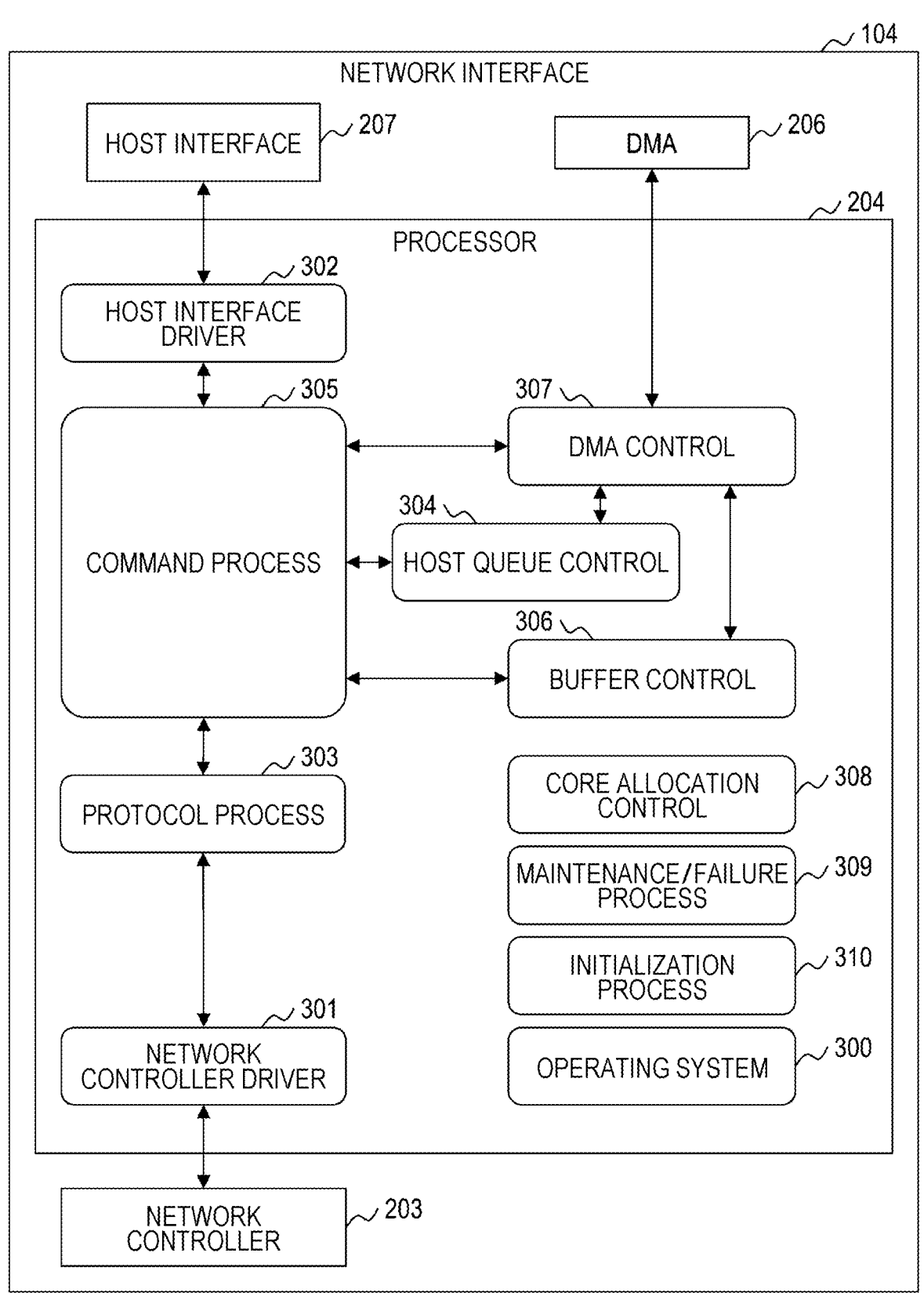
FIG. 4 is a diagram illustrating an example of a relationship of a program of the network interface in the first embodiment.

FIG. 4 is a diagram illustrating an example of a relationship of the program of the network interface in the first embodiment.

In the network interface 104, the operating system 300 is operated, and each software program is operated on the operating system 300. In addition, the network interface 104 performs initial setting, maintenance such as software update, a failure process, and the like by the initialization process 310 and the maintenance/failure process 309. The failure process includes, for example, failure detection and collection of dump trace information such as statistical information and error information.

The core allocation control 308 controls allocation of the core 205 that executes the network protocol process in communication with the host connected via the port.

The network controller driver 301 controls the network controller 203, stores a transmission packet in the packet buffer of the network controller 203, and acquires a reception packet from the packet buffer. In addition, setting for offloading a frame process of a data link layer, an Internet protocol layer, and a transport layer, a stateless process such as checksum calculation is performed.

Upon receiving the operation of the network controller driver 301, the protocol process 303 executes the network protocol process of an IP, TCP, UDP, iSCSI PDU process, and an NVMe/TCP PDU process. The protocol process 303 processes a reception packet received from the network controller driver 301 and extracts control information, and information and data such as an iSCSI PDU, and an NVMe/TCP PDU. Sometimes the received packet does not contain any data . . . . The protocol process 303 outputs the extracted information to the command process 305. Data may be transferred to the host via the buffer controlled by the buffer control 306 or without passing via the buffer.

The protocol process 303 includes information acquired from the command process 305 and data transmitted from the host in the transmission packet to the network. Data may be transferred to the network via the buffer controlled by buffer control 306 or without passing via the buffer. Sometimes the transmission packet does not contain any data.

The command process 305 executes a command process in cooperation with the host queue control 304, the buffer control 306, and the DMA control 307. The command process 305 controls the host interface 207 via the host interface driver 302. The command process 305 transmits and receives a transmission command or a reception command in network communication with the host system, for example, information for generating a PDU of iSCSI or NVMe/TCP, analyzed information, or the PDU itself. The command is transmitted and received to and from the host system by using the queue interface. The host queue control 304 controls this queue interface.

The command process 305 generates a descriptor that can be processed by the host from the result of the protocol process 303 and stores the descriptor in the queue via the host queue control 304. In addition, the descriptor generated by the host system is acquired from the queue, and each function in the network interface 104 such as the protocol process 303 is set and used. The descriptor of the queue can be transmitted and received between the host system and the network interface 104 by the DMA control 307 using DMA controller 206.

Figure 5A:
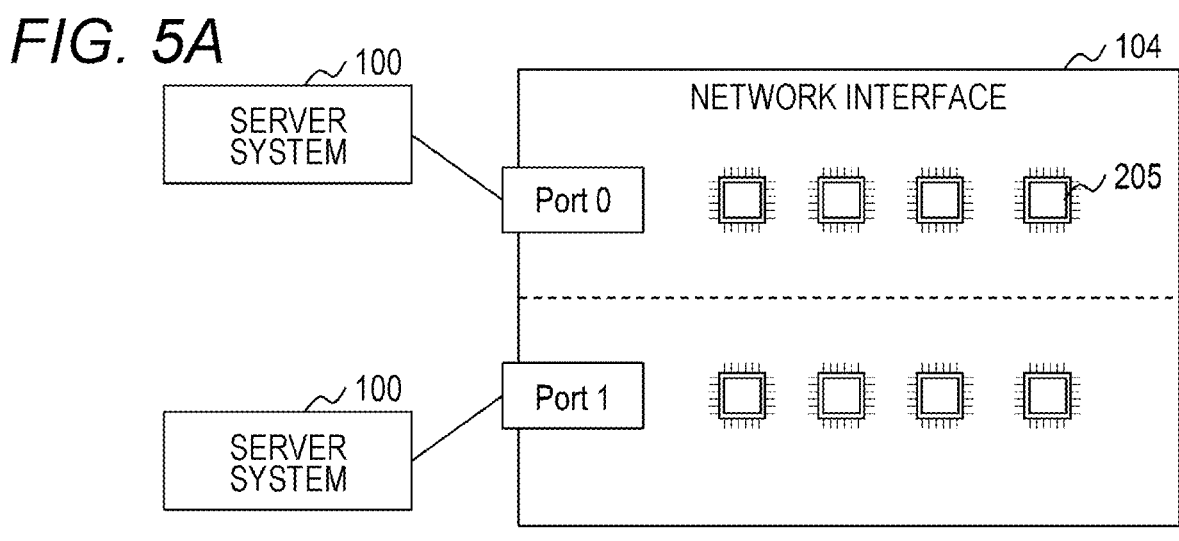
FIG. 5A is a diagram illustrating an example of a core allocation mode of the network interface in the first embodiment.
Figure 5B:
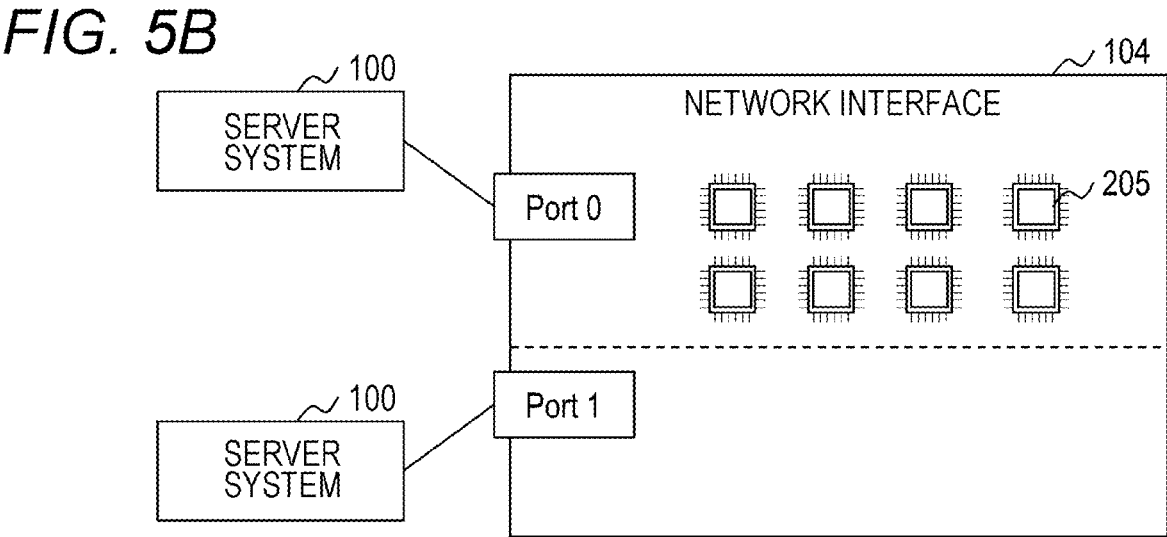
FIG. 5B is a diagram illustrating another example of the core allocation mode of the network interface in the first embodiment.
Figure 5C:
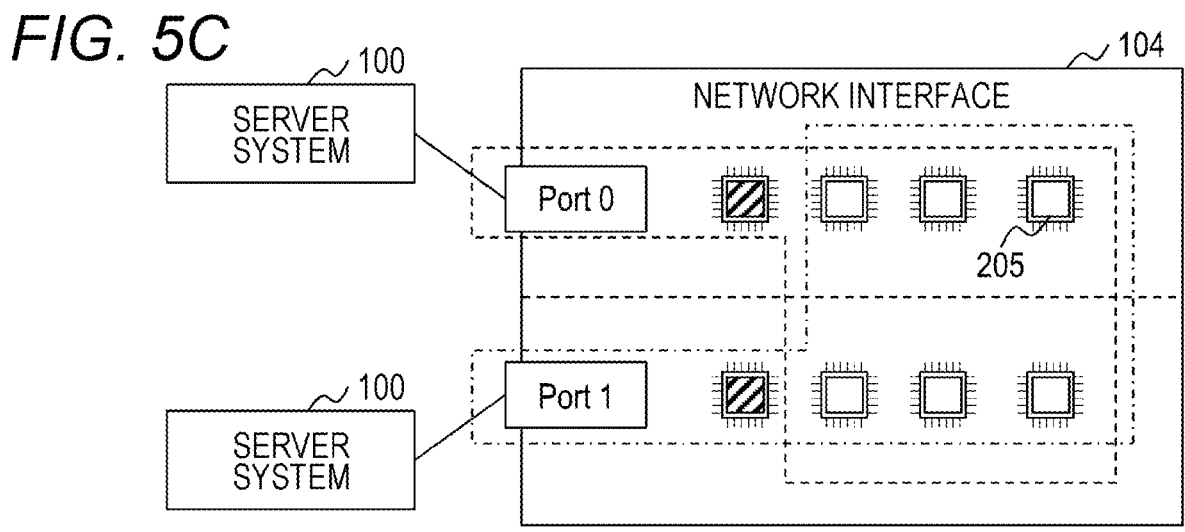
FIG. 5C is a diagram illustrating still another example of the core allocation mode of the network interface in the first embodiment.

FIGS. 5A to 5C are diagrams illustrating examples of an allocation mode of the core 205 of the network interface 104 in the first embodiment.

In the allocation mode of the core 205 illustrated in FIG. 5A, the cores 205 are allocated to each port at a predetermined ratio. In FIG. 5A, the cores 205 are equally allocated to two ports. The core 205 allocated to the port performs the network protocol process on data transmitted and received via the port. In the following description, the allocation mode of the core 205 illustrated in FIG. 5A is referred to as a first allocation mode.

In an allocation mode of the cores 205 illustrated in FIG. 5B, all cores 205 are allocated to one port. In the following description, the allocation mode of the core 205 illustrated in FIG. 5B is referred to as a second allocation mode.

In the allocation mode of the cores 205 illustrated in FIG. 5C, one core 205 is exclusively allocated to one port, and the other cores 205 are allocated in a time division manner. In FIG. 5C, hatched cores 205 indicate cores that are exclusively allocated to the ports. Two or more cores 205 may be exclusively allocated. In the following description, the exclusively allocated core 205 is referred to as an occupied core 205, and the core 205 allocated in a time division manner is referred to as a shared core 205. In addition, the allocation mode of the cores 205 illustrated in FIG. 5C is referred to as a third allocation mode.

The occupied core 205 executes the network protocol process for commands and data transmitted and received via the allocated ports and the management process of the allocated ports. The occupied core 205 does not execute the network protocol process and the management process of other ports. The management process related to the port is, for example, port initialization, abort, reset, or the like. The shared core 205 executes the network protocol process for data transmitted and received via the port.

In the third allocation mode, since the occupied core 205 executes the management process, it is possible to reduce an influence between the ports due to the execution of the management process. In addition, since the core 205 can be allocated to one port as much as possible, it is possible to secure the processing performance.

In the first allocation mode and the second allocation mode, information (allocation information) in which the ID of the port and the core 205 are associated with each other is generated. In the third allocation mode, information (allocation information) in which the ID of the port and the occupied core 205 are associated with each other is generated.

The allocation mode of the cores 205 can be selected by the user. As another allocation mode, an allocation mode in which one occupied core 205 is allocated to each port and cores 205 other than the occupied core 205 are allocated to each port at a predetermined ratio is also conceivable.

Figure 6:
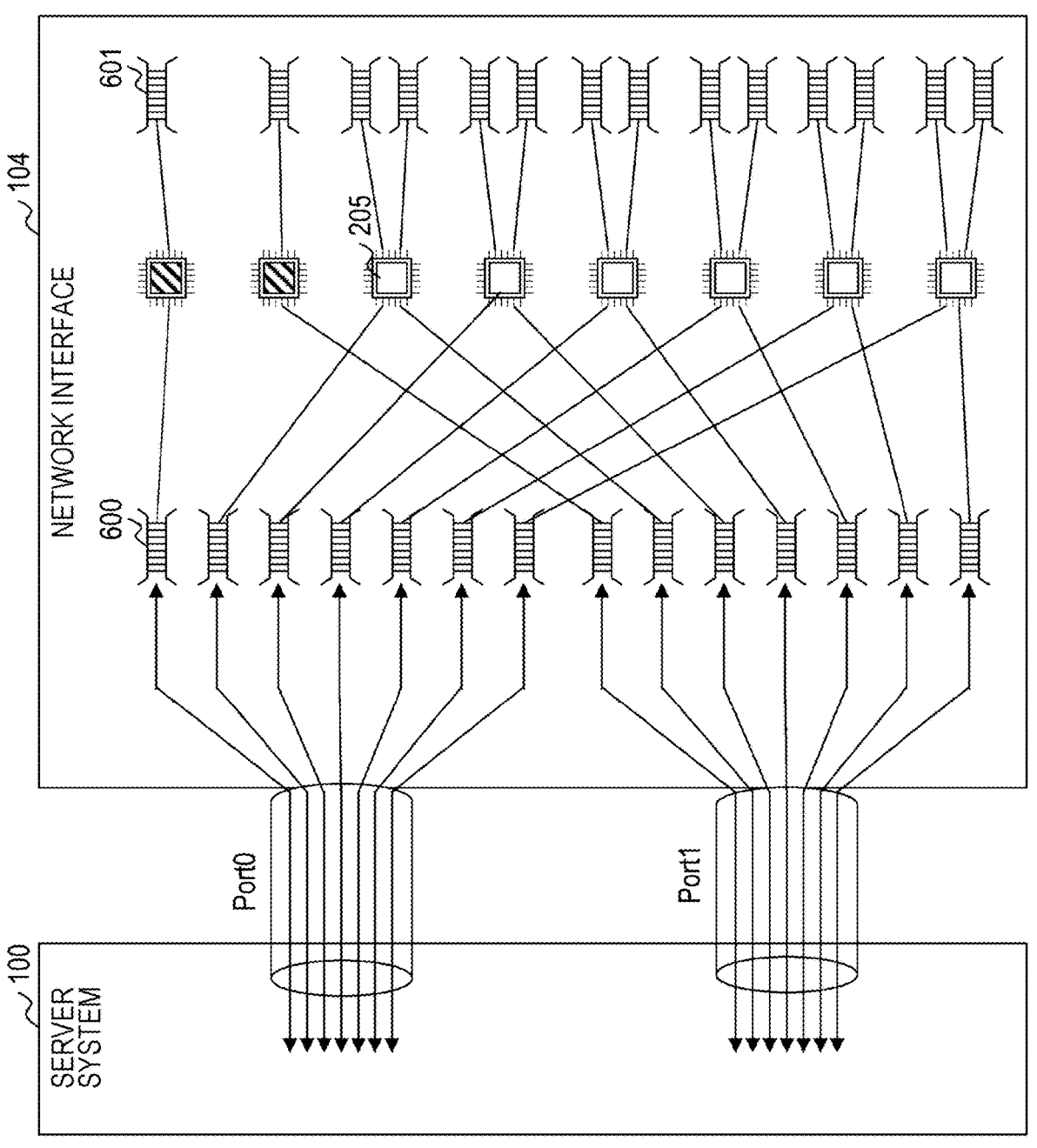
FIG. 6 is a diagram illustrating a correspondence relationship between cores and queues in the network interface in the first embodiment.

FIG. 6 is a diagram illustrating a correspondence relation between an I/O queue 600 between the core 205 and the server system 100 and a queue 601 between the core 205 and the host in the network interface 104 in the first embodiment. FIG. 6 illustrates a correspondence relation between the I/O queue 600 between the core 205 and the server system and the queue 601 between the core 205 and the host in the third allocation mode. The hatched core 205 represents the occupied core 205 and the white core 205 represents the shared core 205. FIG. 6 illustrates a configuration in which the queue 601 is divided for each of Port0 and Port1, and only the queue for one port is allocated to the occupied core 205, and a total of two queues 601 divided for each of Port0 and Port1 are allocated to the shared core 205. However, a configuration in which the core has the queue 601 one by one without having the queue for the number of ports, or a configuration in which the host has the queue only one by one for each port and distributes the queue to each core in the network interface may be made.

For one port, the I/O queue 600 is set as many as the maximum allocation number of the cores 205. In the example illustrated in FIG. 6, since a maximum of seven cores 205 are allocated to one port, seven I/O queues 600 are set. The occupied core 205 executes a process of one I/O queue 600 of the allocated port, and the shared core 205 is controlled to execute a process of the I/O queue 600 of each port.

The queue 601 handled by the occupied core 205 is controlled to transfer a command and data of the network protocol process or data and a command of the management process related to the port. The queue 601 handled by the shared core 205 is controlled to transfer data and a command of the network protocol process. The transfer control of the command and data to the queue 601 is performed by the host queue control 304 or the DMA control 307.

By adopting the third allocation mode, it is possible to suppress the influence on the processing of other ports to the minimum while executing the management process of one port.

Figure 7A:
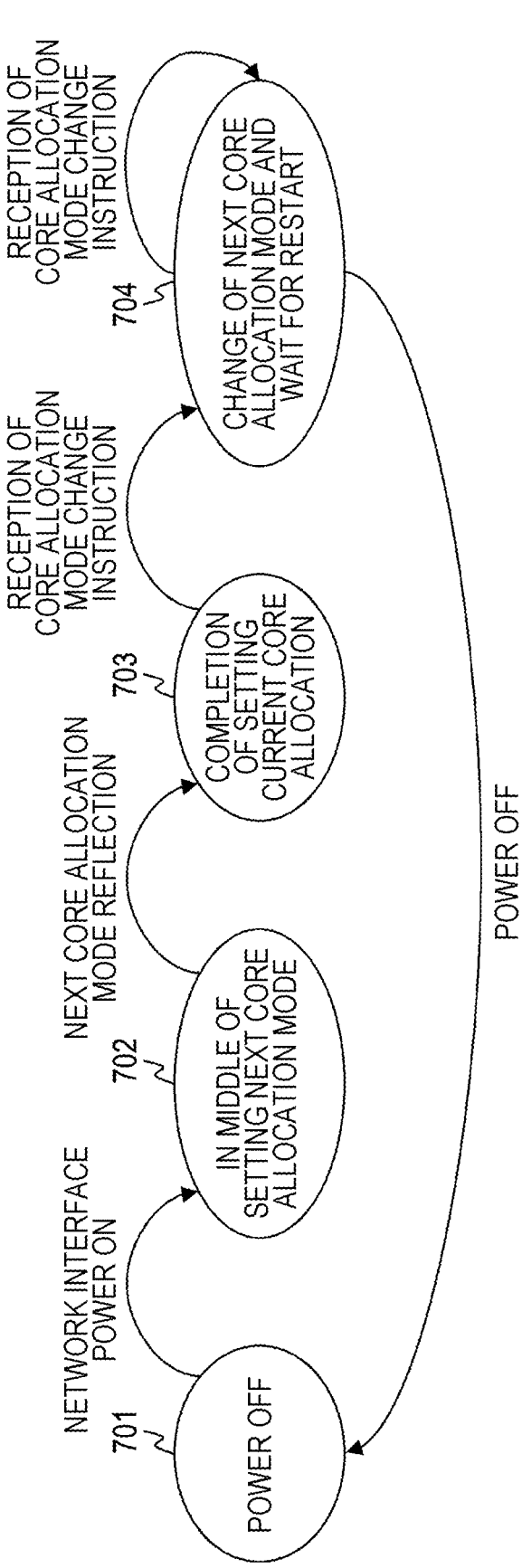
FIG. 7A is a diagram illustrating an example of state transition in core allocation control of the network interface in the first embodiment.
Figure 7B:
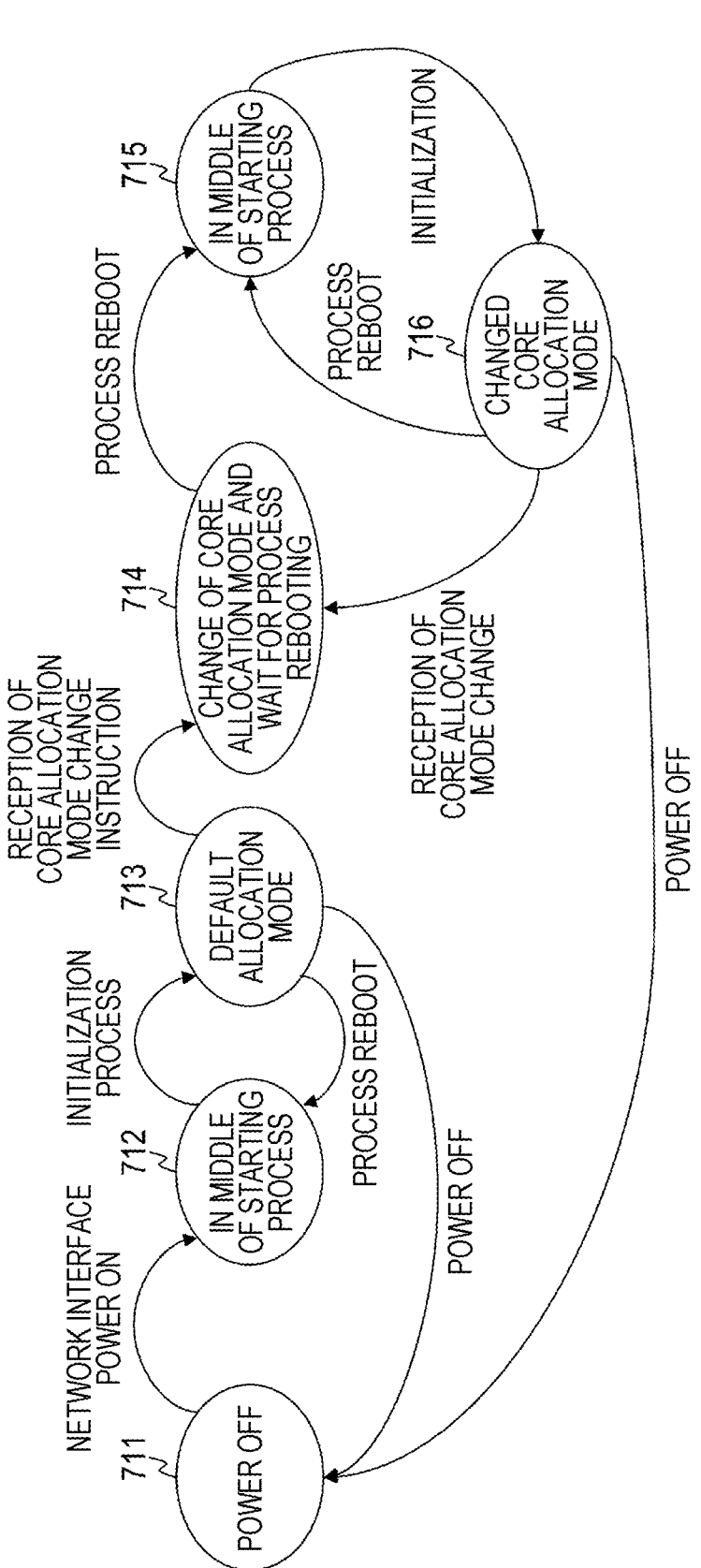
FIG. 7B is a diagram illustrating another example of the state transition in the core allocation control of the network interface in the first embodiment.
Figure 9:
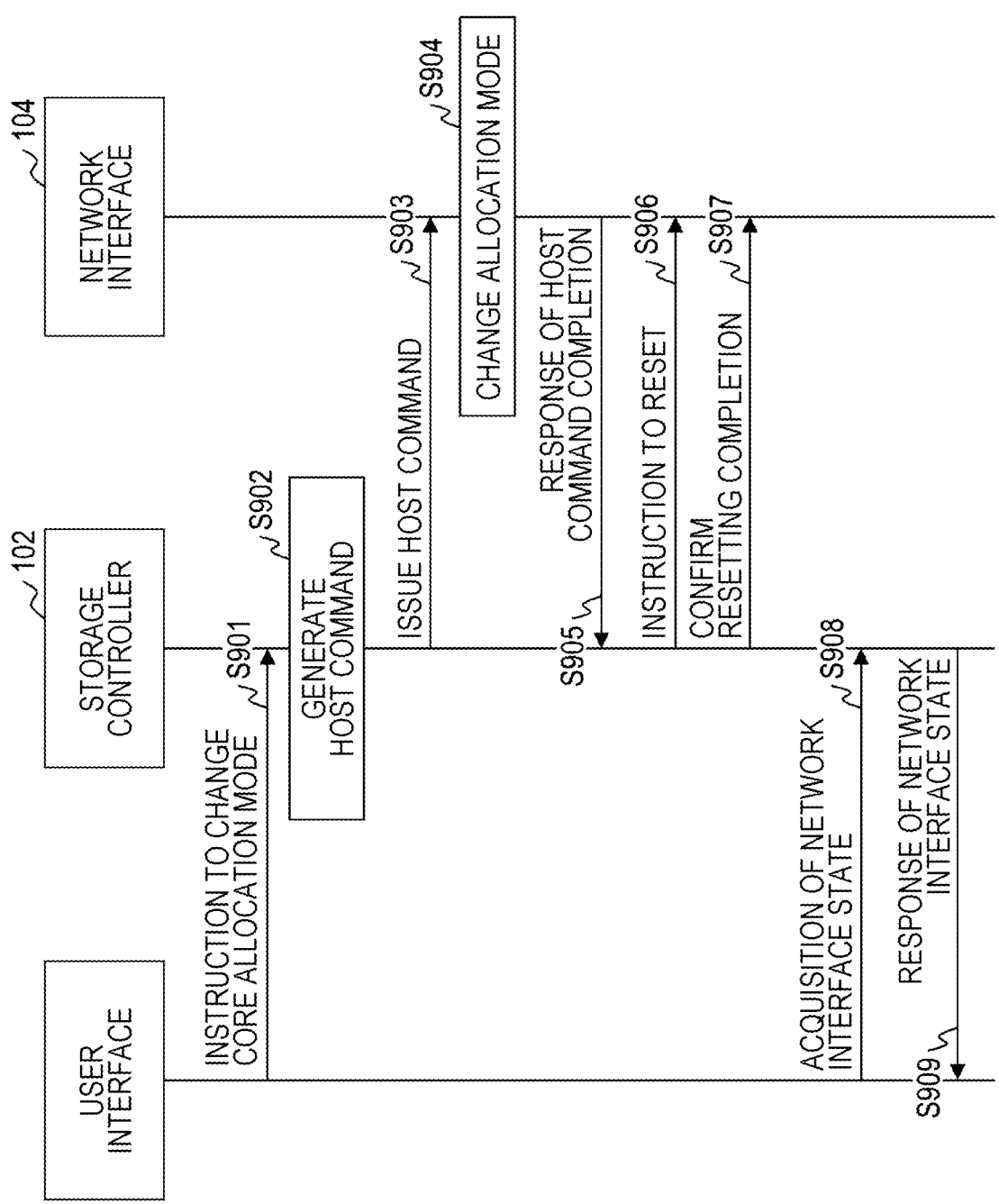
FIG. 9 is a sequence diagram illustrating an example of a procedure of changing an allocation mode of the network interface in the first embodiment.

The network interface 104 in the present embodiment performs the allocation control of the core 205 according to one of the three allocation methods. FIGS. 7A and 7B are diagrams illustrating examples of the state transition in the allocation control of the core 205 in the network interface 104 in the first embodiment. FIG. 8 is a diagram illustrating an example of allocation mode management information retained by the network interface 104 in the first embodiment. FIG. 9 is a sequence diagram illustrating an example of a procedure of changing the allocation mode of the network interface 104 in the first embodiment.

FIG. 7A is a state transition diagram in a case where the network interface 104 manages the allocation mode. In this case, the network interface 104 manages the allocation mode by using allocation mode management information 800 as illustrated in FIG. 8. The allocation mode management information 800 includes a current allocation mode 801 in which information of the current allocation mode is stored and a next allocation mode 802 in which information of the allocation mode at the time of the next start is stored.

In a case where the power is turned ON, the network interface 104 transitions from a state 701 to a state 702. In the state 702, the network interface 104 starts the allocation control of the core 205 in the allocation mode set to the next allocation mode 802. After starting the allocation control of the core 205, the network interface 104 transitions to a state 703 and sets the allocation mode of the next allocation mode 802 to the current allocation mode 801.

In a case where an allocation mode change instruction is received, the network interface 104 transitions to a state 704, updates the next allocation mode 802, and waits for restart. In a case where the allocation mode change instruction is received in the state 704, the network interface 104 transitions to the state 704 again. In a case where restarting is performed in the state 704, the allocation control of the core 205 is performed in the changed allocation mode.

Here, the procedure for changing the allocation mode will be described with reference to FIG. 9.

The user instructs the storage controller 102 that is a network interface host to change the allocation mode via a user interface (not illustrated) (Step S901).

The storage controller 102 generates a host command for changing the allocation mode (Step S902) and issues the host command to the network interface 104 (Step S903).

The network interface 104 updates the next allocation mode 802 of the allocation mode management information 800 (Step S904). Thereafter, the network interface 104 transmits, as a response, host command completion (Step S905).

The storage controller 102 instructs the network interface 104 to reset (power OFF) (Step S906). In addition, the storage controller 102 accesses the network interface 104 and confirms the reset completion (Step S907).

The user instructs the storage controller 102 to acquire the state of the network interface 104 via the user interface (Step S908). In a case where the instruction is received, the storage controller 102 transmits, as a response, the state of the network interface 104 (Step S909).

FIG. 7B is a state transition diagram in a case where the network interface 104 does not manage the allocation mode. In this case, a default allocation mode is set in the network interface 104.

In a case where the power is turned ON, the network interface 104 transitions from a state 711 to a state 712 and executes the initialization process. After the initialization process is completed, the network interface 104 starts core allocation control in the default allocation mode and transitions to a state 713. In a case where process rebooting has occurred, the network interface 104 transitions to the state 712.

In a case where the allocation mode change instruction is received, the network interface 104 transitions to a state 714 and waits for process rebooting for changing to the instructed allocation mode. In a case where process rebooting has occurred, the network interface 104 transitions from the state 711 to the state 712, starts the initialization process, starts the core allocation control in the changed allocation mode, and then transitions to a state 716. In a case where the process rebooting has occurred, the network interface 104 transitions to a state 715. In a case where the allocation mode change instruction is received, the network interface 104 transitions to the state 714.

The procedure of changing the allocation mode is similar to that in FIG. 9. However, in Step S904, the network interface 104 waits for the process rebooting in the instructed allocation mode. In Step S905, the storage controller 102 instructs the network interface 104 to perform process rebooting.

Figure 10:
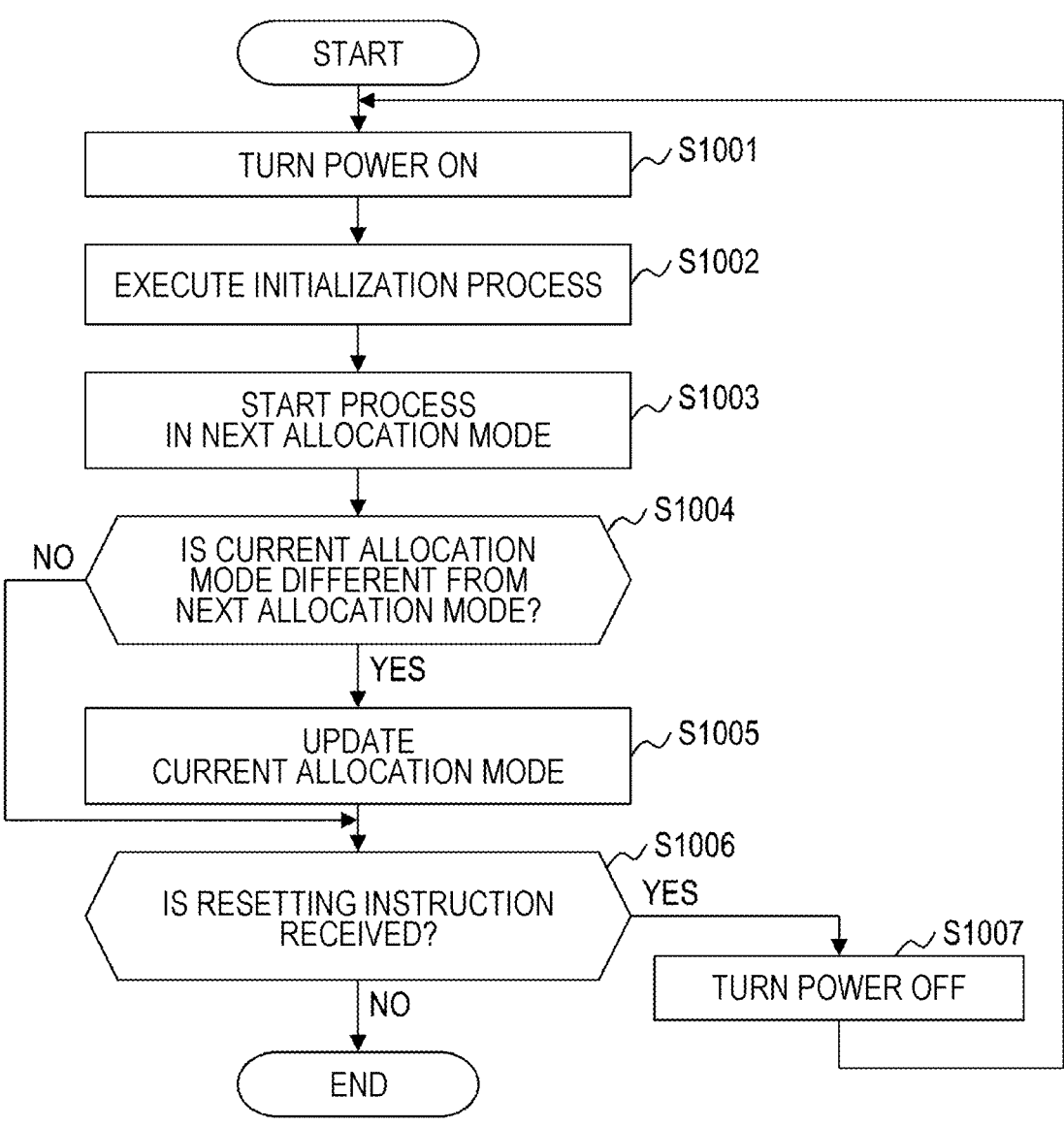
FIG. 10 is a flowchart illustrating an example of an allocation mode setting process at a time of start, which is executed by the network interface in the first embodiment.

FIG. 10 is a flowchart illustrating an example of an allocation mode setting process at the time of start, which is executed by the network interface 104 in the first embodiment. In FIG. 10, the process executed by the network interface 104 adopting the method of FIG. 7A will be described.

In a case where the power is turned ON (Step S1001), the network interface 104 executes an initialization process (Step S1002).

After the initialization process is completed, the network interface 104 starts the process in the next allocation mode (Step S1003).

The network interface 104 refers to the allocation mode management information 800 to determine whether or not the current allocation mode 801 is different from the next allocation mode 802 (Step S1004).

In a case where the current allocation mode 801 coincides with the next allocation mode 802, the network interface 104 proceeds to Step S1006.

In a case where the current allocation mode 801 is different from the next allocation mode 802, the network interface 104 updates the current allocation mode 801 (Step S1005), and then proceeds to Step S1006. Specifically, the current allocation mode 801 is overwritten with the value of the next allocation mode 802.

In Step S1006, the network interface 104 determines whether or not a resetting instruction has been received as a result of hardware check by the storage controller 102 as the network interface host (Step S1006).

In a case where the resetting instruction has not been received, the network interface 104 ends the allocation mode setting process and starts various processes.

In a case where the resetting instruction is received, the network interface 104 transitions to power OFF (Step S1007) and then transitions to power ON (Step S1001).

Figure 11:
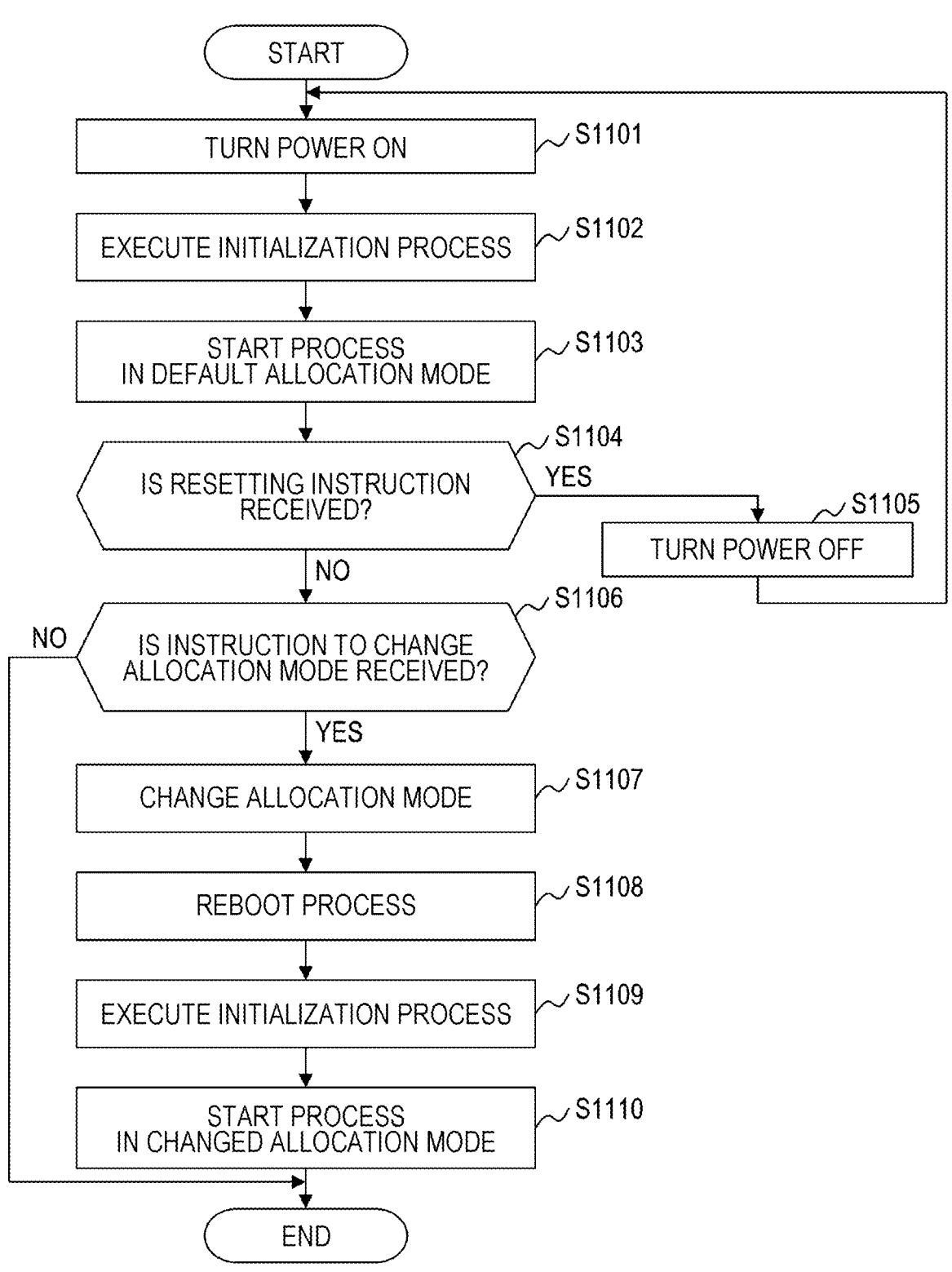
FIG. 11 is a flowchart illustrating another example of the allocation mode setting process at a time of start, which is executed by the network interface in the first embodiment.

FIG. 11 is a flowchart illustrating another example of the allocation mode setting process at a time of start, which is executed by the network interface 104 in the first embodiment. In FIG. 11, the process executed by the network interface 104 adopting the method of FIG. 7B will be described.

In a case where the power is turned ON (Step S1101), the network interface 104 executes an initialization process (Step S1102).

After the initialization process is completed, the network interface 104 starts the process in the default allocation mode (Step S1103).

The network interface 104 determines whether or not a resetting instruction has been received as a result of hardware check by the storage controller 102 as the network interface host (Step S1104).

In a case where the resetting instruction is received, the network interface 104 transitions to power OFF (Step S1105) and then transitions to power ON (Step S1101).

In a case where the resetting instruction has not been received, the network interface 104 starts receiving the allocation mode change instruction for a certain period of time. The network interface 104 monitors the allocation mode change instruction for a certain period, and determines whether or not the change instruction has been received (Step S1106).

In a case where the allocation mode change instruction has not been received, the network interface 104 ends the allocation mode setting process and starts various processes.

In a case where the allocation mode change instruction is received, the network interface 104 changes the allocation mode (Step S1107) and reboots the process (Step S1108).

After rebooting the process, the network interface 104 executes the initialization process (Step S1109).

After the initialization process is completed, the network interface 104 starts the process in the changed allocation mode (Step S1110). Thereafter, the network interface 104 ends an allocation mode setting process and starts various processes.

Figure 12:
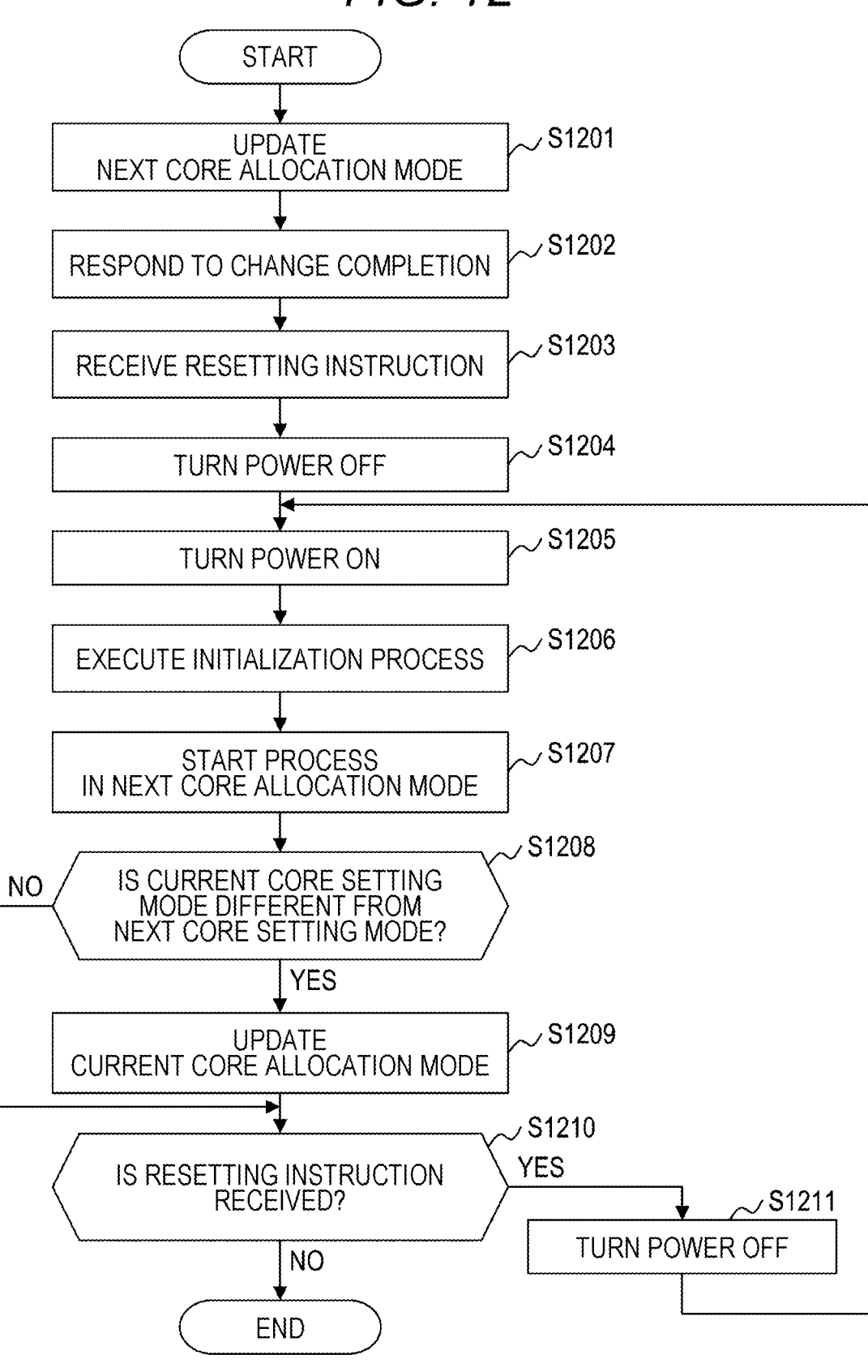
FIG. 12 is a flowchart illustrating an example of the allocation mode setting process during execution of a network protocol process executed by the network interface in the first embodiment.

FIG. 12 is a flowchart illustrating an example of the allocation mode setting process during execution of the network protocol process executed by the network interface 104 in the first embodiment. In FIG. 12, the process executed by the network interface 104 adopting the method of FIG. 7A will be described.

In a case where the allocation mode change instruction is received during the execution of the network protocol process, the network interface 104 starts a process described below.

The network interface 104 updates the next allocation mode 802 of the allocation mode management information 800 (Step S1201), and transmits, as a response, change completion to the storage controller 102 (Step S1202).

In a case where a resetting instruction is received from the storage controller 102 (Step S1203), the network interface 104 transitions to power OFF (Step S1204) and then transitions to power ON (Step S1205).

The processes from Step S1205 to Step S1211 are the same as the processes from Step S1001 to Step S1007.

Figure 13:
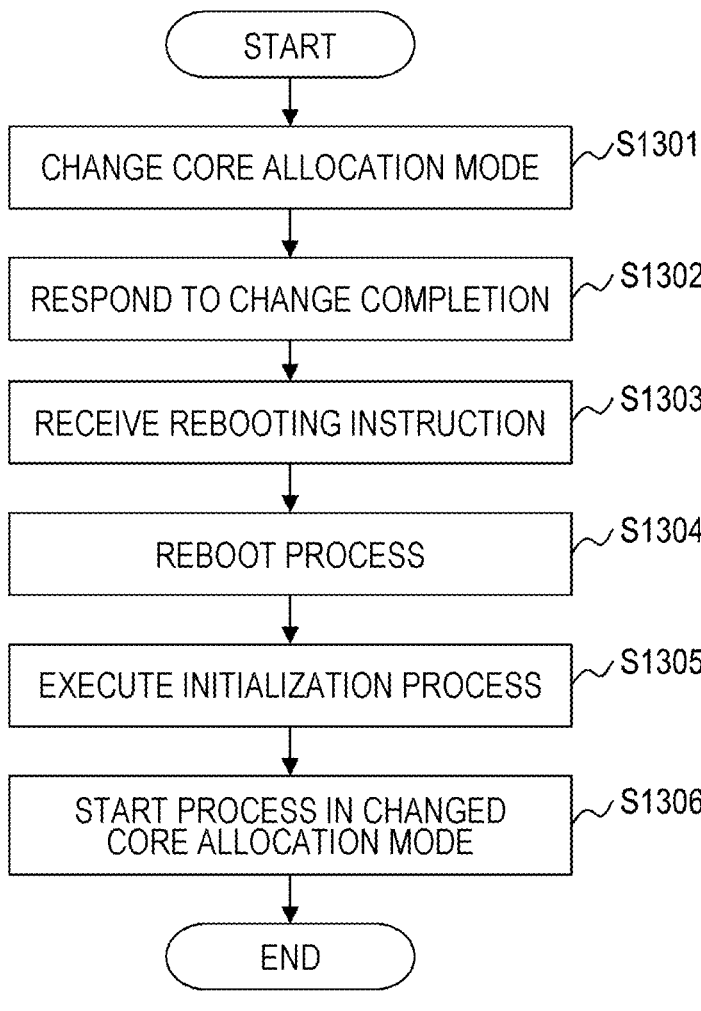
FIG. 13 is a flowchart illustrating another example of the allocation mode setting process during the execution of the network protocol process executed by the network interface in the first embodiment.

FIG. 13 is a flowchart illustrating another example of the allocation mode setting process during the execution of the network protocol process executed by the network interface 104 in the first embodiment. In FIG. 13, the process executed by the network interface 104 adopting the method of FIG. 7B will be described.

In a case where the allocation mode change instruction is received during the execution of the network protocol process, the network interface 104 starts a process described below.

The network interface 104 changes the allocation mode (Step S1301), and transmits, as a response, change completion to the storage controller 102 (Step S1302).

In a case where a rebooting instruction is received from the storage controller 102 (Step S1303), the network interface 104 reboots the process (Step S1304).

The processes from Step S1305 to Step S1306 are the same as the processes from Step S1109 to Step S1110.

Figure 14A:
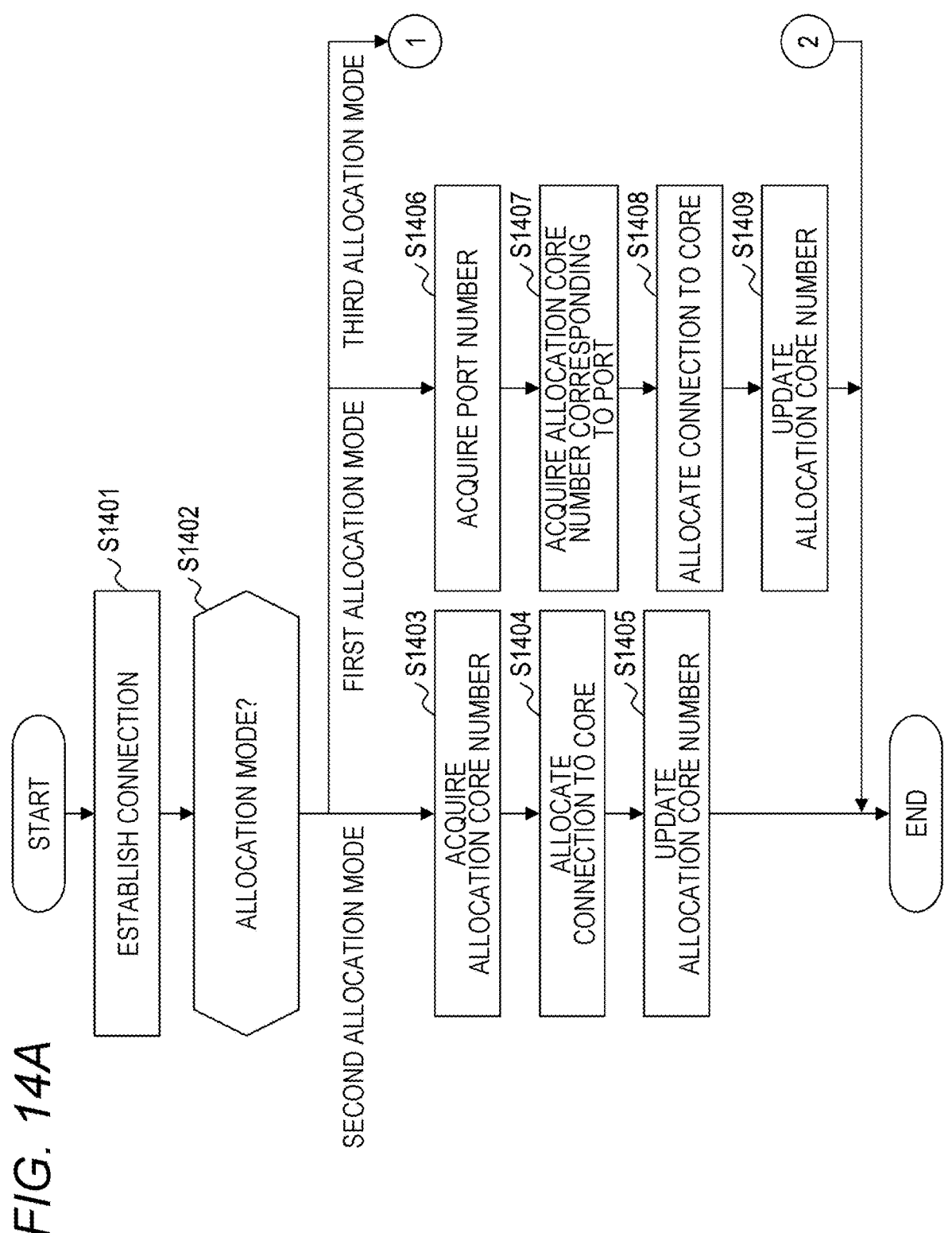
FIG. 14A is a flowchart illustrating an example of a core allocation process executed by the network interface in the first embodiment.
Figure 14B:
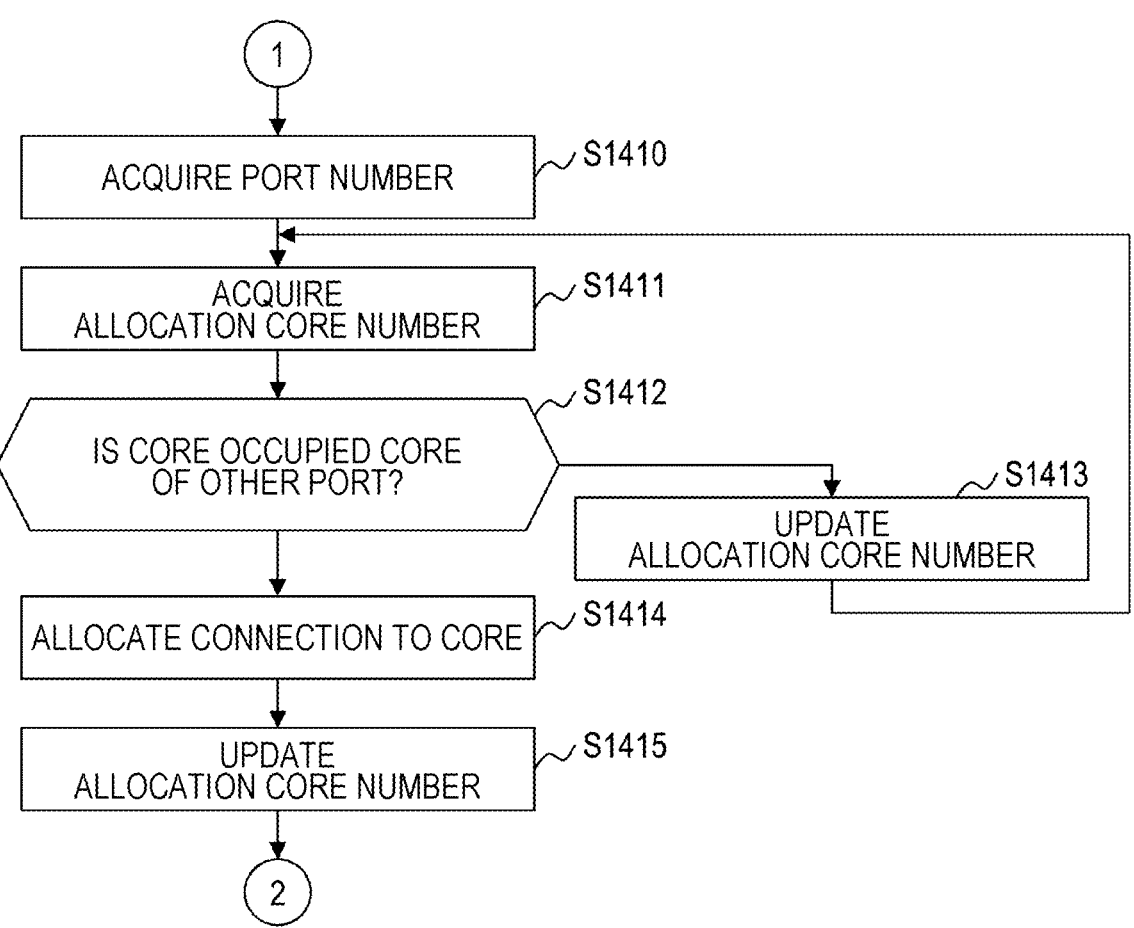
FIG. 14B is a flowchart illustrating another example of the core allocation process executed by the network interface in the first embodiment.

FIGS. 14A and 14B are flowcharts illustrating an example of a core allocation process executed by the network interface 104 in the first embodiment.

After a connection with a device connected via the network interface 104 is established (Step S1401), the network interface 104 determines an allocation mode of the core 205 (Step S1402). In a case where the method of FIG. 7A is adopted, the allocation mode of the core 205 can be determined based on the allocation mode management information 800. In a case where the method of FIG. 7B is adopted, the allocation mode of the core 205 can be determined based on the allocation information.

In a case where the allocation mode is the second allocation mode, the network interface 104 acquires an allocation core number (Step S1403). The allocation core number is an identification number of the core 205.

The network interface 104 allocates a connection to the core 205 corresponding to the allocation core number (Step S1404).

The network interface 104 updates the allocation core number (Step S1405), and ends the core allocation process. For example, the allocation core number is updated such that the core 205 is allocated by the round robin method.

In a case where the allocation mode is the first allocation mode, the network interface 104 acquires the port number of the port that has established the connection (Step S1406).

The network interface 104 acquires an allocation core number corresponding to the port number (Step S1407). In the first allocation mode, since a predetermined number of cores 205 are allocated to the port, the allocation core number is managed for each port.

The network interface 104 allocates a connection to the core 205 corresponding to the allocation core number (Step S1408).

The network interface 104 updates the allocation core number (Step S1409), and ends the core allocation process. For example, the allocation core number is updated such that the core 205 is allocated by the round robin method.

In a case where the allocation mode is the third allocation mode, the network interface 104 acquires the port number of the port that has established the connection (Step S1410).

The network interface 104 acquires the allocation core number (Step S1411).

The network interface 104 determines whether or not the core is an occupied core of a port other than the port number acquired by the core 205 corresponding to the allocation core number (Step S1412).

In a case where the core is the occupied core of the port other than the port number acquired by the core 205 corresponding to the allocation core number, the network interface 104 updates the allocation core number (Step S1413), and then returns to Step S1411. For example, the allocation core number is updated such that the core 205 is allocated by the round robin method.

In a case where the core is not the occupied core of the port other than the port number acquired by the core 205 corresponding to the allocation core number, the network interface 104 allocates a connection to the core 205 corresponding to the allocation core number (Step S1414).

The network interface 104 updates the allocation core number (Step S1415), and ends the core allocation process. For example, the allocation core number is updated such that the core 205 is allocated by the round robin method.

Figure 15:
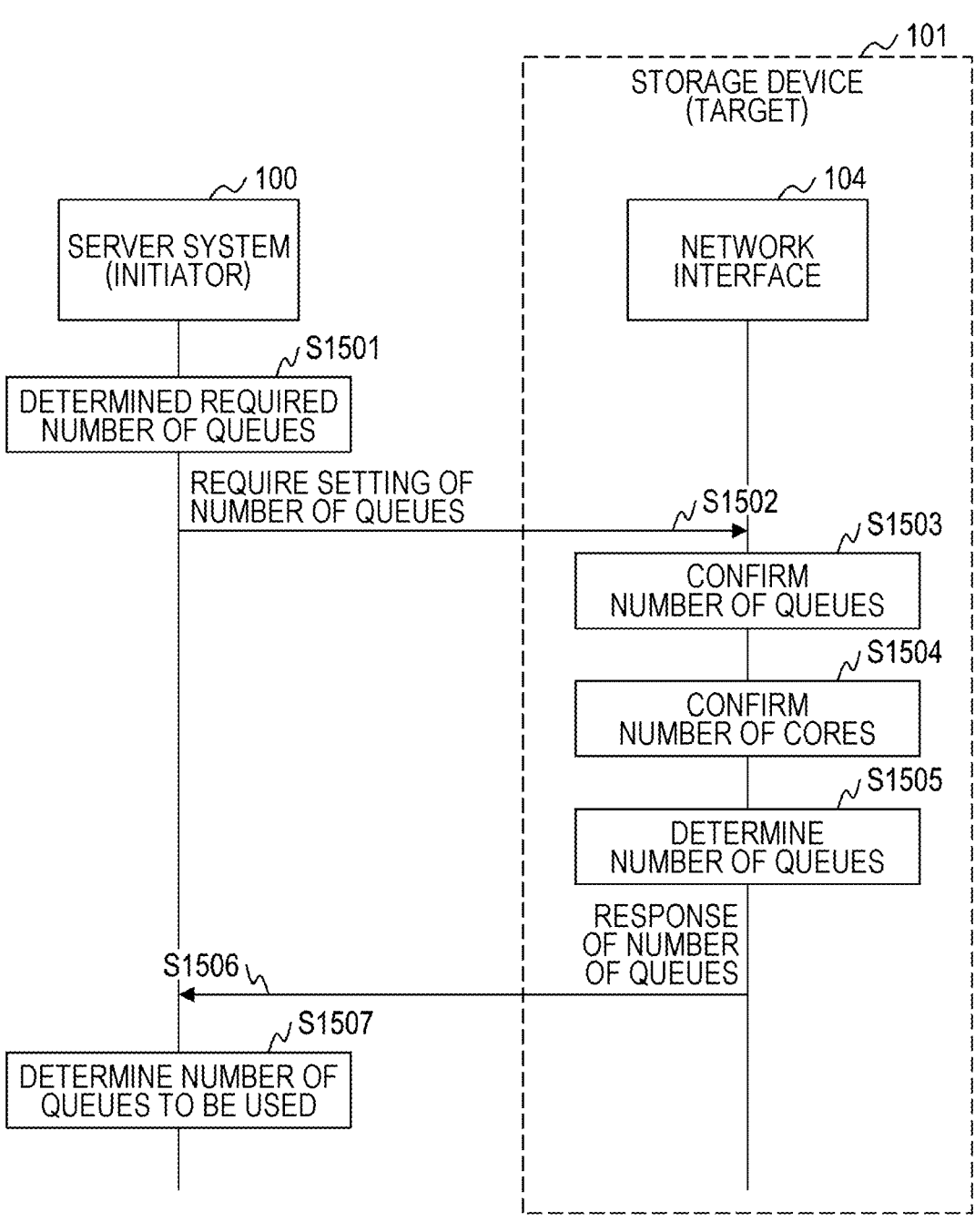
FIG. 15 is a sequence diagram illustrating a flow of setting a queue of the network interface in the first embodiment.

FIG. 15 is a sequence diagram illustrating a flow of setting a queue of the network interface 104 in the first embodiment.

For example, at the time of establishment of the NVMe/ TCP connection, the server system 100 that is the initiator determines the number of queues to be requested to the target (Step S1501), and transmits a queue setting request to the storage device 101 that is the target (Step S1502).

The network interface 104 receives the queue setting request and confirms the number of requested queues (Step S1503).

The network interface 104 confirms the number of cores 205 that can be allocated to the port that has received the queue setting request (Step S1504), and determines the number of queues to be set based on the confirmed number (Step S1505). For example, an integral multiple of the number of cores 205 is determined as the number of queues. At this time, the number of requested queues may be considered.

After the determined number of queues is set, the network interface 104 transmits a response including the determined number of queues to the server system 100 as the initiator (Step S1506).

The server system 100 determines the number of queues to be used based on the response (Step S1507).

In a case where the number of queues handled by the core 205 is large, overhead associated with queue switching occurs. The network interface 104 in the present embodiment determines the number (maximum number) of queues based on the number of cores 205 that can be allocated to a port, and notifies the server system 100, which is an initiator. As a result, it is possible to reduce the occurrence of overhead.

Figure 16:
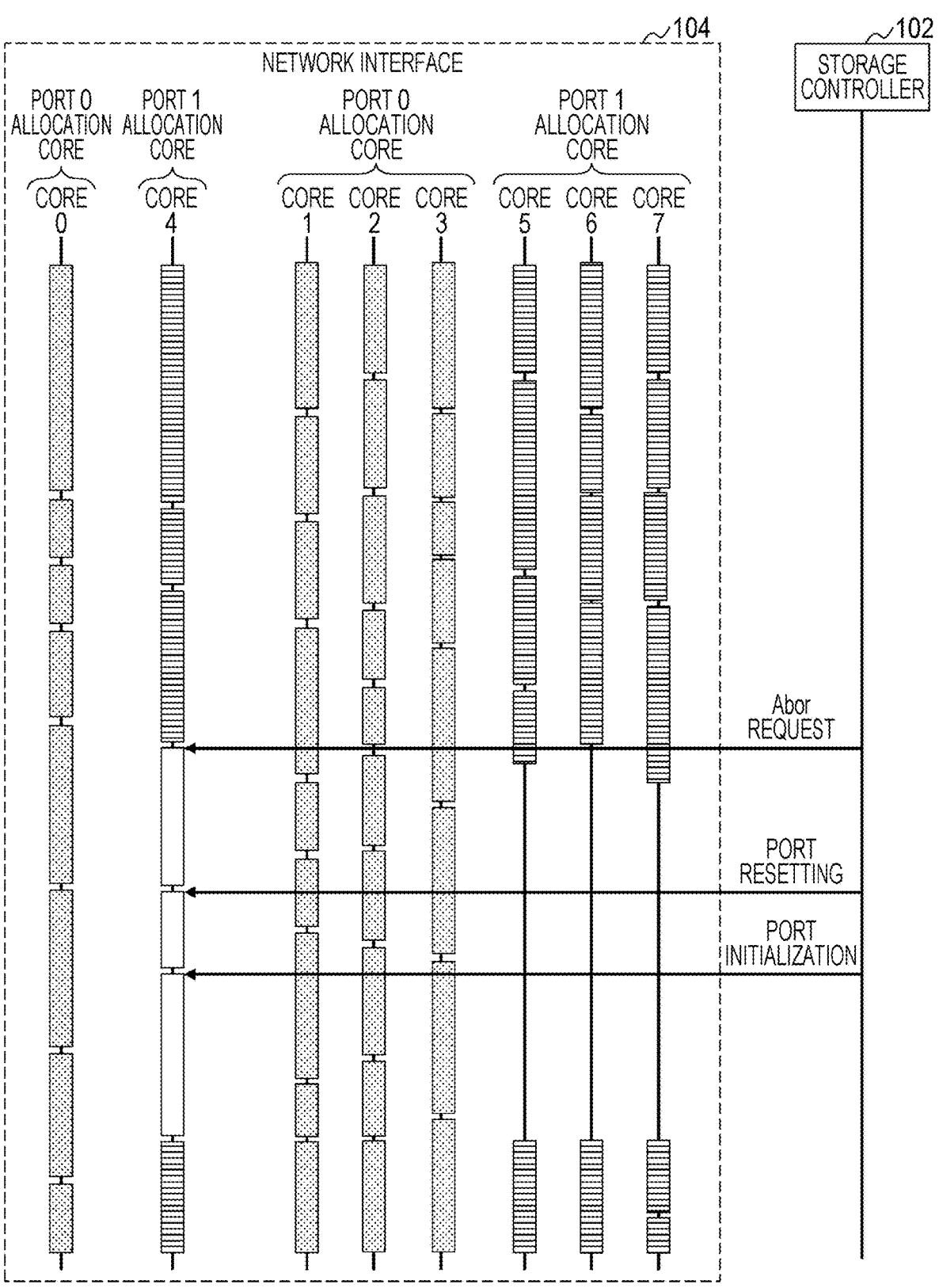
FIG. 16 is a diagram illustrating an example of distribution of processes and operation states in the network interface in the first embodiment.
Figure 17:
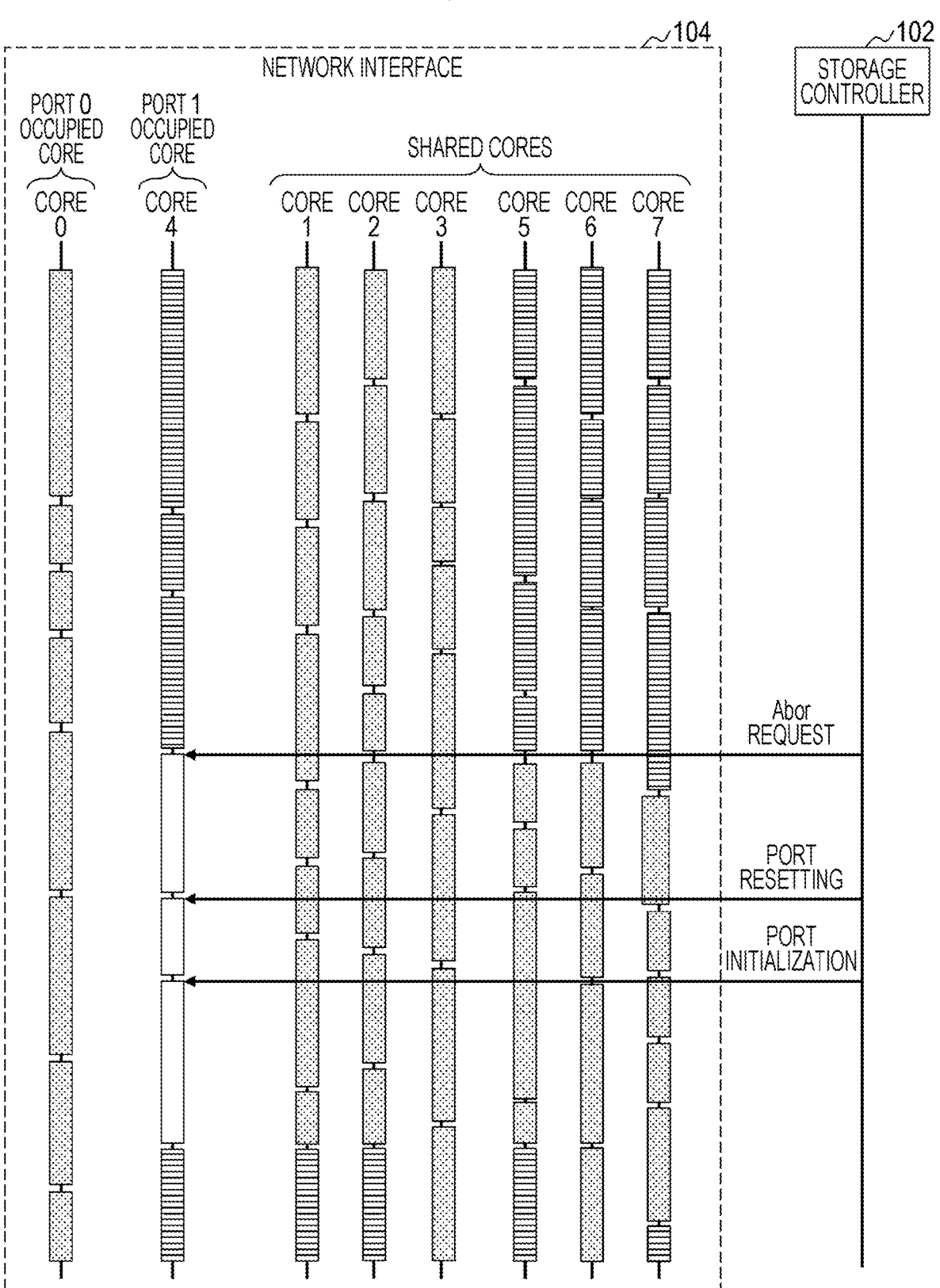
FIG. 17 is a diagram illustrating another example of distribution of the processes and the operation states in the network interface in the first embodiment.

FIGS. 16 and 17 are diagrams illustrating examples of distribution and operation states of the network protocol process in the network interface 104 in the first embodiment. Here, it is assumed that the network interface 104 has a port 0 and a port 1.

FIG. 16 illustrates distribution and operation states of processes in the network interface 104 operating in the first allocation mode. A rectangular dot wave represents the network protocol process of the port 0, a hatched rectangle represents the network protocol process of the port 1, and a white rectangle represents the management process of the port 1.

In the first allocation mode, the cores 205 are allocated to the two ports at a predetermined ratio. Each core 205 executes the network protocol process of the allocated port. In a case where the management process of the port 1 is received, the core (4) executes the management process. The network protocol process of the port 1 is not executed in the other cores (5), (6), and (7) until the management process is completed.

FIG. 17 illustrates distribution and operation states of processes in the network interface 104 operating in the third allocation mode. A rectangular dot wave represents the network protocol process of the port 0, a hatched rectangle represents the network protocol process of the port 1, and a white rectangle represents the management process of the port 1.

The occupied core 205 executes the network protocol process and the management process of the allocated ports. The shared core 205 executes the network protocol process of the ports allocated in the time division manner. In a case where a management process execution request is received, the occupied core (4) executes the management process. During the execution of the management process, the network protocol process of the port 1 is not executed, but the network protocol process of the port 0 is executed by using the shared core 205.

In a case where the magnitude of a load of the network protocol process is known in advance, the connection may be allocated in consideration of the performance of the core, the usage rate of the core, and the like.

The present invention is not limited to the embodiment described above, and includes various modifications. In addition, for example, the above-described embodiment has been described in detail in order to describe the present invention in an easy-to-understand manner, and are not necessarily limited to those having all the described configurations. Further, a part of the configuration of each embodiment can be added to, deleted from, or replaced with another configuration.

In addition, some or all of the above-described configurations, functions, processing units, processing means, and the like may be realized by hardware, for example, by designing with an integrated circuit. In addition, the present invention can also be realized by a program code of software that realizes the functions of the embodiment. In this case, a storage medium in which the program codes are recorded is provided to a computer, and a processor included in the computer reads the program code stored in the storage medium. In this case, the program codes themselves read from the storage medium realize the functions of the above-described embodiment, and the program codes themselves and the storage medium storing the program codes constitute the present invention. As a storage medium for supplying such program codes, for example, a flexible disk, a CD-ROM, a DVD-ROM, a hard disk, a solid state drive (SSD), an optical disk, a magneto-optical disk, a CD-R, a magnetic tape, a non-volatile memory card, a ROM, or the like is used.

In addition, the program codes for realizing the functions described in the present embodiment can be implemented by a wide range of programs or script languages such as assembler, C/C++, perl, Shell, PHP, Python, Java (registered trademark), and the like.

Furthermore, program codes of software that realize the functions of the embodiment may be distributed via a network to be stored in storage means such as a hard disk or a memory of a computer or a storage medium such as a CD-RW or a CD-R, and a processor included in the computer may read and execute the program code stored in the storage means or the storage medium.

In the above-described embodiment, the control lines and the information lines indicate what is considered to be necessary for the description, and do not necessarily indicate all the control lines and the information lines on the product. All the configurations may be connected to each other.

What is claimed is:

1. A storage system comprising:
   at least one storage controller on which a network interface including a processor including a plurality of cores, a memory connected to the processor, and a plurality of ports connected to the processor is mounted, wherein
   the processor
   allocates at least one occupied core to each of the plurality of ports,
   controls the occupied core to execute a management process of the port to which the occupied core is allocated and a network protocol process of communication performed via the port to which the occupied core is allocated, and
   controls the cores other than the occupied core to execute the network protocol process of the communication performed via the port.

2. The storage system according to claim 1, wherein in a case where the processor detects an execution trigger of the network protocol process of one of the ports, the processor causes a core other than the occupied core or the occupied core of the port to execute the network protocol process.

3. The storage system according to claim 1, wherein the processor allocates the cores other than the occupied core to each of the plurality of ports at a predetermined ratio, and in a case where an execution trigger of the network protocol process of one of the ports is detected, causes the core allocated to the port other than the occupied core or the occupied core of the port to execute the network protocol process.

4. The storage system according to claim 1, wherein the processor determines the number of queues of each of the plurality of ports based on a maximum allocated number of the cores including the occupied core of the port.

5. The storage system according to claim 1, wherein the processor provides an interface for selecting an allocation mode of allocating the at least one occupied core to each of the plurality of ports, an allocation mode of allocating all the cores to one of the ports, and an allocation mode of allocating the cores to each of the plurality of ports at a predetermined ratio.

6. A core allocation control method of a network interface that is mounted on a storage controller of a storage system and includes a processor including a plurality of cores, a memory connected to the processor, and a plurality of ports connected to the processor, the core allocation control method comprising:

allocating, by the processor, at least one occupied core to each of the plurality of ports;

controlling, by the processor, the occupied core to execute a management process of the port to which the occupied core is allocated and a network protocol process of communication performed via the port to which the occupied core is allocated; and controlling, by the processor, the core other than the occupied core to execute the network protocol process of the communication performed via the port.

7. The core allocation control method of a network interface according to claim 6, further comprising:

in a case where the processor detects an execution trigger of the network protocol process of one of the ports, causing the core other than the occupied core or the occupied core of the port to execute the network protocol process.

8. The core allocation control method of a network interface according to claim 6, wherein the allocating of at least one occupied core includes allocating, by the processor, the cores other than the occupied core to each of the plurality of ports at a predetermined ratio, and the core allocation control method of a network interface further comprises:

in a case where the processor detects an execution trigger of the network protocol process of one of the ports, causing the core allocated to the port other than the occupied core or the occupied core of the port to execute the network protocol process.

9. The core allocation control method of a network interface according to claim 6, further comprising:

determining, by the processor, the number of queues of each of the plurality of ports based on the maximum allocated number of the cores including the occupied core of the port.

10. The core allocation control method of a network interface according to claim 6, further comprising:

presenting, by the processor, an interface for selecting an allocation mode of allocating the at least one occupied core to each of the plurality of ports, an allocation mode of allocating all the cores to one of the ports, and an allocation mode of allocating the cores to each of the plurality of ports at a predetermined ratio.

* * * * *